US010638306B2

(12) United States Patent
Shekhar et al.

(10) Patent No.: US 10,638,306 B2
(45) Date of Patent: Apr. 28, 2020

(54) METHODS AND APPARATUS FOR USE IN REDUCING SIGNAL LATENCY IN A MOBILE NETWORK WITH USE OF LOCALIZED UNIFIED DATA MANAGEMENT (UDM) ENTITIES

(71) Applicant: Cisco Technology, Inc., San Jose, CA (US)

(72) Inventors: Ravi Shekhar, Maharashtra (IN); Ameo Ghosh, Mohammadwadi Pune (IN); Sharad Chandra, Mohammadwadi Pune (IN); Humberto Jose La Roche, Ocean, NJ (US); Ian McDowell Campbell, Littleton, CO (US)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 15/855,859

(22) Filed: Dec. 27, 2017

(65) Prior Publication Data
US 2019/0132728 A1 May 2, 2019

Related U.S. Application Data

(63) Continuation of application No. 15/795,532, filed on Oct. 27, 2017.

(51) Int. Cl.
*H04M 3/42* (2006.01)
*H04W 8/20* (2009.01)
(Continued)

(52) U.S. Cl.
CPC .......... *H04W 8/205* (2013.01); *G06F 16/951* (2019.01); *H04W 8/04* (2013.01); *H04W 8/183* (2013.01); *H04W 8/20* (2013.01); *H04W 12/06* (2013.01)

(58) Field of Classification Search
CPC ......... H04W 4/02; H04W 8/18; H04W 8/245; H04W 88/02
(Continued)

(56) References Cited

U.S. PATENT DOCUMENTS 8,655,996 B2   2/2014 Sheth et al.
8,874,814 B2   10/2014 Coffey et al.
(Continued)

FOREIGN PATENT DOCUMENTS

EP        3163949 A1    5/2017
WO    2017012674 A1    1/2017
(Continued)

OTHER PUBLICATIONS

J. Kim et al., "3GPP SA2 Architecture and Functions for 5G Mobile Communication System", The Korean Institute of Communications and Information Sciences (KICS); Mar. 14, 2017, pp. 1-8.
(Continued)

*Primary Examiner* — Temica M Beamer

(57) ABSTRACT

Methods and apparatus for use in reducing signal latency in a mobile network with use of localized Unified Data Management (UDM) entities are described. For example, the technique may employ a plurality of localized UDMs, where each localized UDM is associated with a unique location area. A localized UDM provides for storage of, in a localized Unified Data Repository (UDR), subscriber profile data associated with a subscriber of user equipment (UE). The subscriber profile data stored in the localized UDR may be a replica or copy of at least a subset of subscriber profile data for the subscriber stored in a UDR of a "centralized" UDM. Query access to the localized UDR may be provided for network functions (NFs) or subscriber/UEs. The replica or copy of subscriber profile data may be stored in the localized UDR for those subscribers having use in the location area.

20 Claims, 30 Drawing Sheets

(51) Int. Cl.
  *H04W 8/04* (2009.01)
  *G06F 16/951* (2019.01)
  *H04W 8/18* (2009.01)
  *H04W 12/06* (2009.01)

(58) Field of Classification Search
  USPC ............ 455/418, 414.1, 414.2, 432.3, 433
  See application file for complete search history.

(56) References Cited

U.S. PATENT DOCUMENTS

| | | |
|---|---|---|
| 8,891,423 B2 | 11/2014 | Shaheen et al. |
| 9,325,582 B2 | 4/2016 | Agrawal et al. |
| 2016/0301779 A1 | 10/2016 | Cui et al. |
| 2016/0306813 A1 | 10/2016 | Meredith et al. |
| 2016/0353465 A1 | 12/2016 | Vrzic et al. |
| 2017/0054595 A1 | 2/2017 | Zhang et al. |
| 2017/0070892 A1 | 3/2017 | Song et al. |
| 2017/0093749 A1 | 3/2017 | Hoffmann |
| 2017/0150435 A1 | 5/2017 | Tagg et al. |
| 2017/0245140 A1* | 8/2017 | Au .................. H04W 8/22 |
| 2018/0242304 A1* | 8/2018 | Rong ............ H04W 28/0247 |

FOREIGN PATENT DOCUMENTS

| | | |
|---|---|---|
| WO | 2017063708 A1 | 4/2017 |
| WO | 2017074486 A1 | 5/2017 |
| WO | 2017080518 A1 | 5/2017 |
| WO | 2017113100 A1 | 7/2017 |

OTHER PUBLICATIONS

M. Jiang et al., "Network Slicing Management & Prioritizing in 5G Mobile Systems", King's College London, London, UK, pp. 1-6.

T. Yoo, "Network Slicing Architecture for 5G Network", Hyper-Connected Communication Research Lab, Korea University of Science and Technology, Jan. 24, 2017, pp. 1-6.

3GPP, "3rd Generation Partnership Project; Technical Specification Group Services and System Aspects; System Architecture for the 5G System; Stage 2 (Release 15)," 3GPP TS 23.501, v1.2.0, Jul. 2017, 166 pages.

Extreme, "ExtremeWireless™ 3916ic Indoor Camera Access Point," Data Sheet, Mar. 2017, 9 pages.

"3rd Generation Partnership Project; Technical Specification Group Services and System Aspects; System Architecture for the 5G System; Stage 2 (Release 15)", 3GPP Draft; 23501-140-RM, 3rd Generation Partnership Project (3GPP), Sep. 28, 2019, 151 pages.

"3rd Generation Partnership Project; Technical Specification Group Core Network and Terminals; User Data Convergence (UDC); Technical realization and information flows; Stage 2 (Release 14)", 3GPP Standard; Technical Specification; 3GPP TS 23.335; 3rd Generation Partnership Project (3GPP), vol. CT WG4, No. V14.0.0, Mar. 15, 2017, 39 pages.

International Search Report and Written Opinion in counterpart International Application No. PCT/US2018/056813, dated Dec. 21, 2018, 15 pages.

\* cited by examiner

US 10,638,306 B2

METHODS AND APPARATUS FOR USE IN REDUCING SIGNAL LATENCY IN A MOBILE NETWORK WITH USE OF LOCALIZED UNIFIED DATA MANAGEMENT (UDM) ENTITIES

RELATED APPLICATIONS

This application claims the benefit if U.S. patent application Ser. No. 15/795,532, filed on Oct. 27, 2017, which is incorporated by reference herein.

TECHNICAL FIELD

The present disclosure relates generally to methods and apparatus for use in reducing signal latency in communications associated with a Unified Data Management (UDM) entity of a mobile network, and more particularly to methods and apparatus for reducing the signal latency with use of localized UDMs in the mobile network.

BACKGROUND

There is a need for reducing signal latency in communications associated with use of a Unified Data Management (UDM) entity in a mobile network, especially a 5G mobile network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
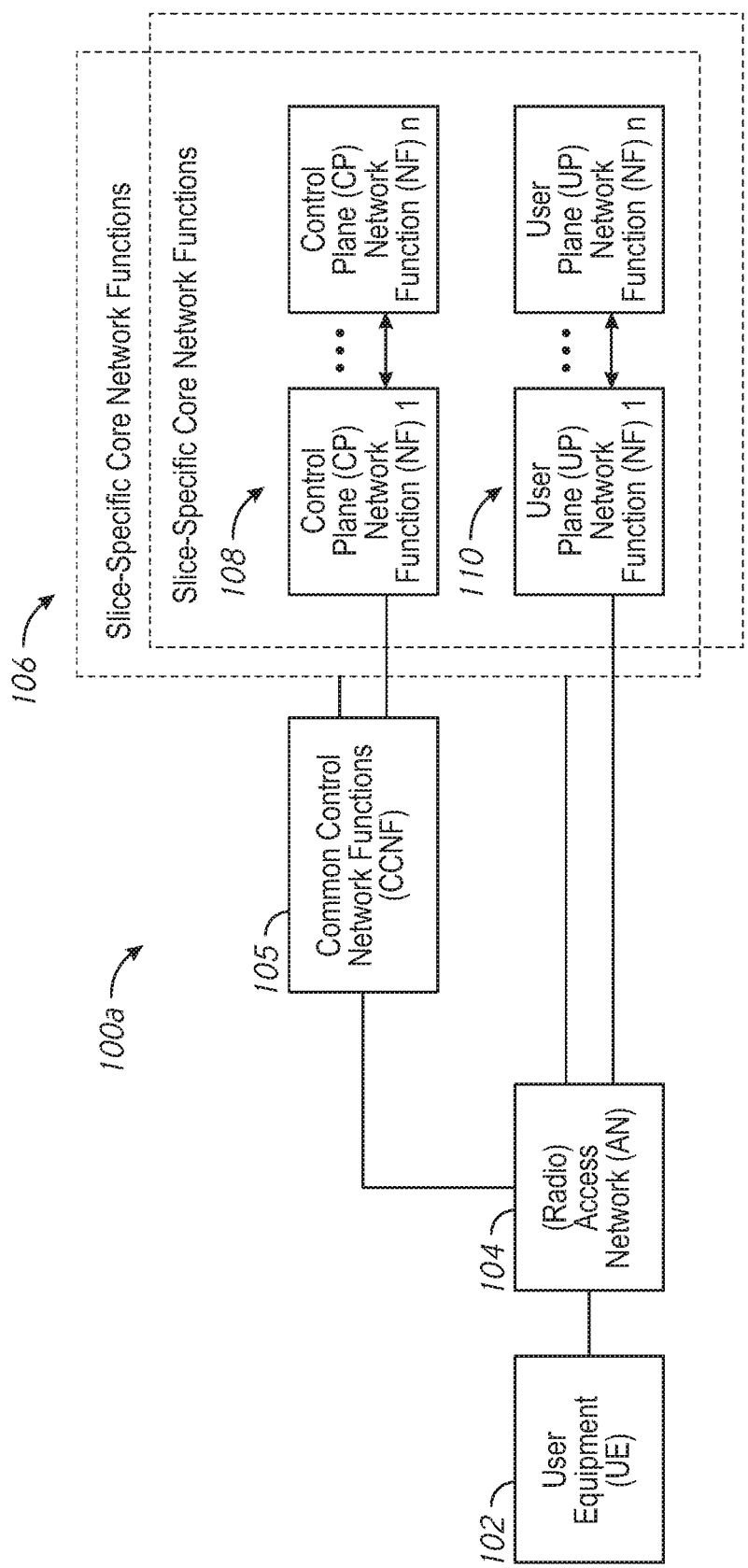
FIG. 1A is an illustrative block diagram of a basic network architecture of a 5G mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in reducing signal latency in communications associated with use of a Unified Data Management (UDM) entity having a Unified Data Repository (UDR) in a mobile network are described herein.

In one illustrative example, a technique may employ a plurality of localized UDMs, where each localized UDM is associated with a unique location area. A localized UDM provides for storage of, in a localized UDR, subscriber profile data associated with a subscriber of user equipment (UE). The subscriber profile data stored in the localized UDR may be a replica or copy of at least a subset of subscriber profile data for the subscriber stored in the UDR of the UDM. The replica or copy of the subscriber profile data may be stored in the localized UDR for (e.g. only) those subscribers having (e.g. frequent or substantial) use in the location area. Query access to the localized UDR may be provided for network functions (NFs) in the mobile network.

In some implementations, an entity such as the centralized UDM may determine a list of locations of use (e.g. locations of frequent or substantial use) for each subscriber based on reports of subscriber use or visitation sent from the localized UDMs. The centralized UDM may push or otherwise send replicas or copies of subscriber profile data from the UDM to those localized UDMs included in the list.

In another illustrative example, a UDM or other suitable entity is configured to embody one or more techniques for use in reducing signal latency in communications. At the UDM entity, a plurality of reports of visited locations of a subscriber are received from each one of a plurality of localized UDM entities (e.g. as described above). A list of locations of use (e.g. locations of frequent or substantial use) of the subscriber is determined based on the received reports of visited locations of the subscriber. A replica or copy of at least a subset of subscriber profile data associated with the subscriber is sent to each one of the localized UDM entities indicated by the locations in the determined list.

Thus, multiple copies of data may be made selectively available for access to thereby provide for a Geographically Highly Available (GeoHA) system.

Example Embodiments

FIG. 1A is an illustrative block diagram of a basic network architecture 100a of a 5G mobile network which may embodied one or more aspects of the present disclosure. Basic network architecture 100a of the mobile network is configured to support network slicing. In general, network architecture 100a includes common control network functions (CCNF) 105 and a plurality of slice-specific core network functions 106. A user equipment (UE) 102 may obtain access to the mobile network via an access network (AN) 104, which may be a radio access network (RAN).

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
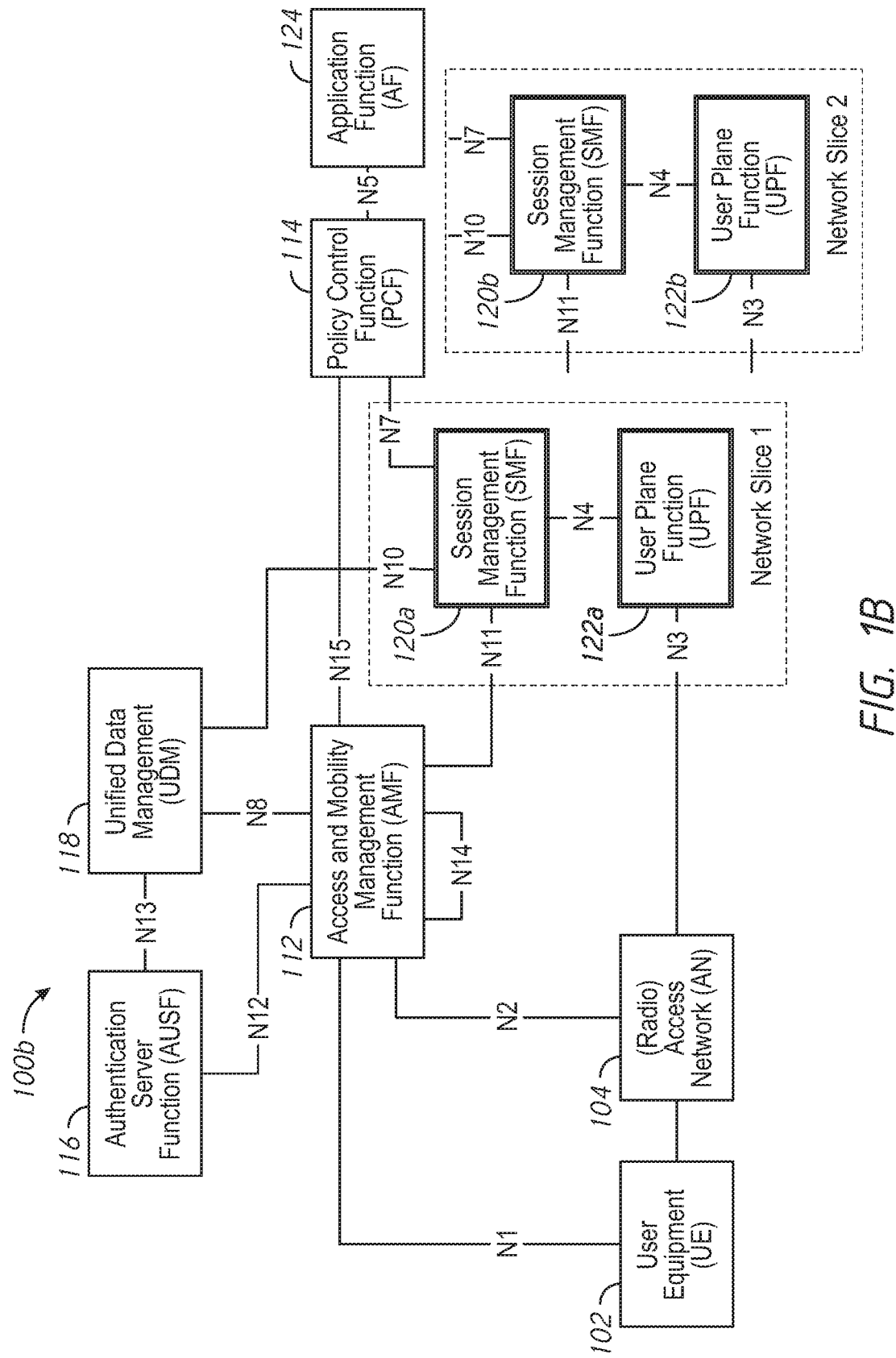
FIG. 1B is an illustrative block diagram of a more detailed network architecture of the 5G mobile network of FIG. 1A.

FIG. 1B is an illustrative block diagram of a more detailed network architecture 100b of the 5G mobile network of FIG. 1A. As provided in 3GPP standards for 5G (e.g. 3GPP 23.501, 23.502), network architecture 100b for a 5G mobile network may include an authentication server function (AUSF) 116, a unified data management (UDM) 118 (having a unified data repository or UDR), an AMF 112, a policy control function (PCF) 114, an SMF 120a, and a UPF 122a. PCF 114 may connect with one or more application functions such as an application function (AF) 124. UPF 122a may connect with one or more data networks (DNs). A plurality of interfaces N1 through N15 shown in FIG. 1 may define the communications and/or protocols between each of the entities, as described in the relevant (evolving) standards documents.

UPF 122*a* is part of the user plane and all other NFs (i.e. AMF 112, SMF 120*a*, PCF 114, AUSF 116, and UDM 118) are part of the control plane. Separating user and control planes guarantees that each plane resource to be scaled independently. It also allows UPFs to be deployed separately from CP functions in a distributed fashion. The NFs in the CP are modularized functions; for example, AMF and SMF are independent functions allowing for independent evolution and scaling.

As illustrated in FIG. 1B, NFs such as SMF 120*a* and UPF 122*a* of FIG. 1B may be provided as specific instances in a first network slice (e.g. network slice 1). Additional instances of NFs for additional network slices may be provided as well, as illustrated by SMF 120*b* and UPF 122*b* provided as additional specific instances in a second network slice (e.g. network slice 2).

The network deploys a network slice based on a network slice selection assistance information (NSSAI) provided by UE 102. During an initial attach procedure by UE 102, the NSSAI is used by RAN 104 to select the CCNF 105. The NSSF in CCNF 105 selects the network slice instance. In general, network slice instance selection may be based on the NSSAI, the data network name (DNN) of the session, subscription data of UE 102, and other parameters. An attach accept message from the network includes an accepted or allowed NSSAI for UE 102.

UDM 120 includes a UDR which may contain all subscriber profile data for all subscribers. Given the large number of devices (e.g. IoT devices) which may be connected to the network, UDM 120 will contain a very large amount of data which will need to be accessed by the devices and Network Functions (NFs). If nothing is done to solve this problem, it will ultimately lead to very high latency of control signaling, along with large numbers of queries across the network.

According to techniques of the present disclosure, a number of "localized" UDMs configured for communications with a UDM may be employed. The UDM, which is common to all subscribers, may be referred to as a common or "centralized" UDM, and/or a subscriber anchor point. Each localized UDM may be associated with a unique location area and maintain access to a localized database (DB) or localized UDR. Each localized UDR may store a replica or copy of subscription profile data associated with each one of a plurality of the subscribers (e.g. a subset of all of the subscribers). The replica or copy of at least a subset of the subscriber profile data may be stored in the localized UDM for (e.g. only) those subscribers having (e.g. frequent or substantial) use in a location area of the localized UDM.

Further, the centralized UDM (or related function or entity) may determine a list of locations of use (e.g. locations of frequent or substantial use) for each subscriber based on reported use or visitations in location areas. Accordingly, in some implementations, the list of locations of use for each subscriber may be determined based on a corresponding mobility pattern of the subscriber. The centralized UDM may push or otherwise send replicas or copies of subscriber profile data from the UDM to those localized UDMs included in the list as needed.

In some implementations, the localized UDMs having the localized UDRs may be provided as Virtual Network Functions (VNFs) or Network Function Virtualization (NFV) entities in mobile edge computing (MEC) gateways. At least conceptually, the technique may be viewed as caching content "closer to the edge," populating multiple caches over time as mobility patterns of subscribers are learnt.

Figure 2A:
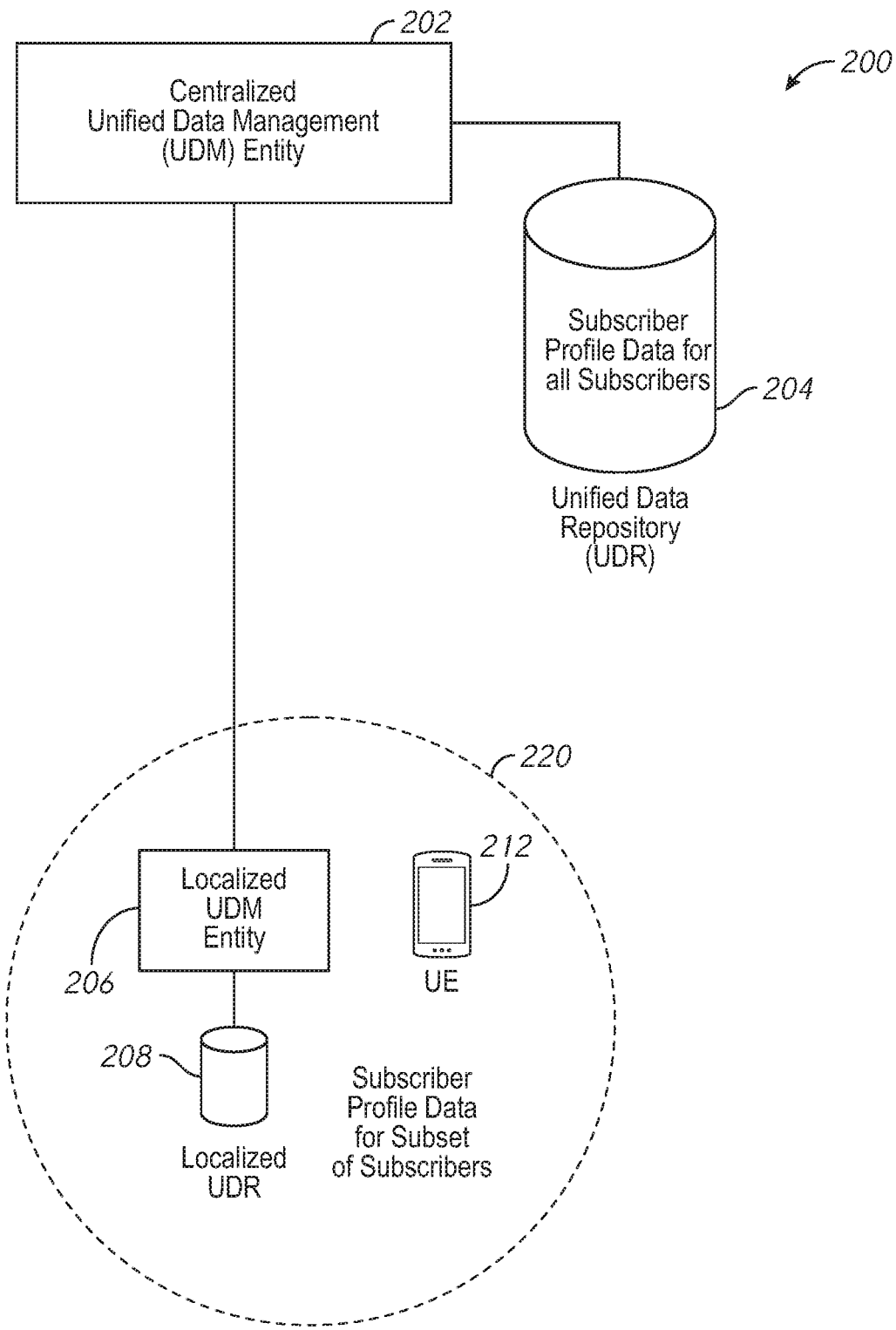
FIG. 2A is an illustrative diagram of a Unified Data Management (UDM) entity of the mobile network, as well as a localized UDM entity configured to communicate with the "centralized" UDM, according to some implementations of the present disclosure.

FIG. 2A is an illustrative diagram of a system 200 which includes a "centralized" Unified Data Management (UDM) entity 202 and a localized UDM entity 206 configured for communications with the centralized UDM entity 202 in accordance with some implementations of the present disclosure. Centralized UDM entity 202 may maintain access to a DB or UDR 204 for storing subscriber profile data for (e.g. most or all) subscribers or UEs in the network. Centralized UDM 202 may be or be referred to as a subscriber anchor point. Note that data other than subscriber profile data may be stored in at centralized UDM 202, and generally referred to as UDR data for subscribers, UEs, or NFs, etc. (i.e. the techniques of the present disclosure are not limited to the use of subscriber profile data).

On the other hand, localized UDM entity 206 may be associated with a location area 220 and maintain access to a localized UDR 208 for storing at least a subset of subscriber profile data for each one of a plurality of the subscribers (i.e. a subset of the subscribers). A localized UDM entity may be referred to as a localized UDM Application Function (AF). The subset of subscribers may be those subscribers determined to have actual (e.g. or frequent) use or visitation of location area 220.

Figure 2B:
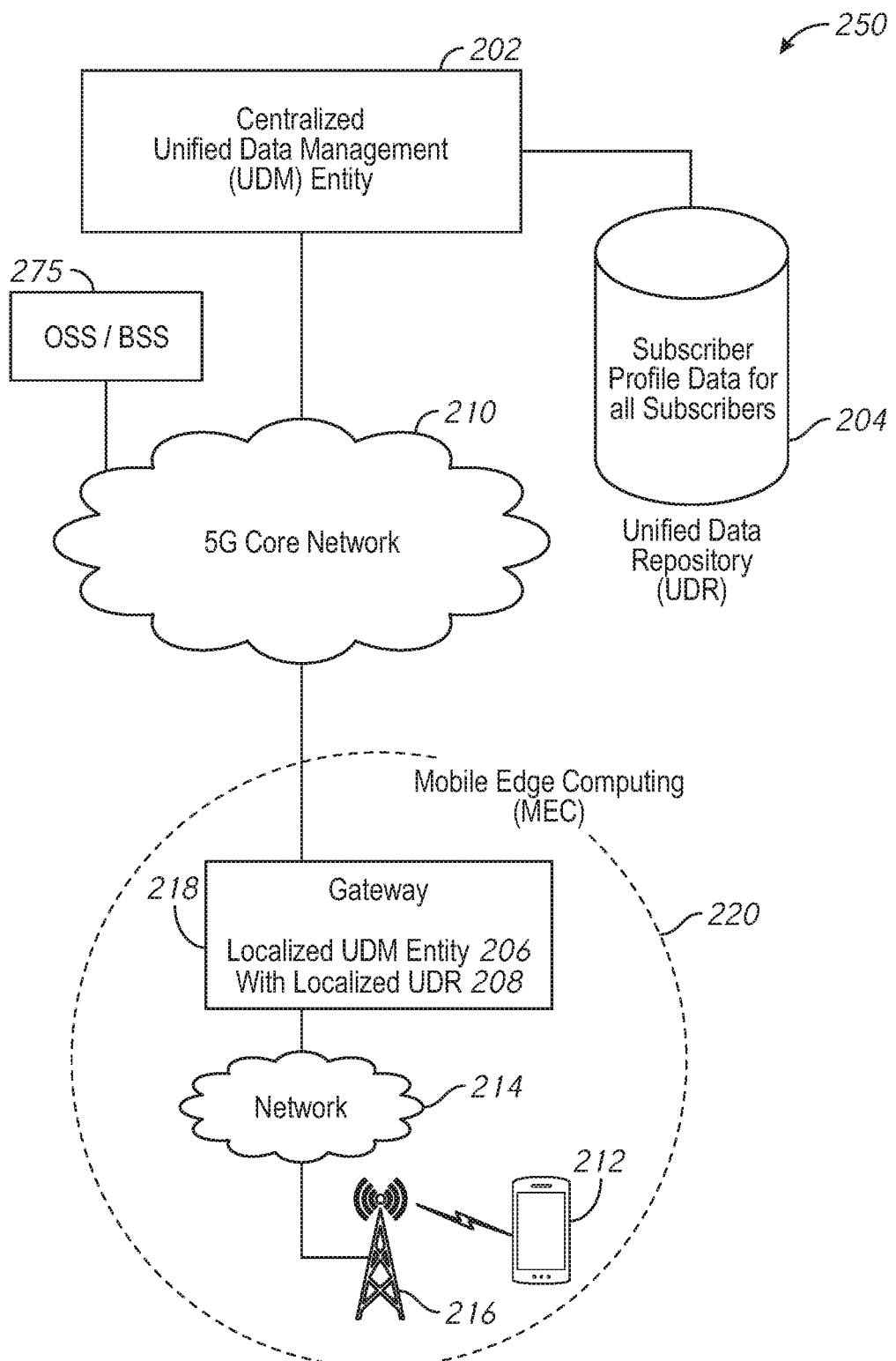
FIG. 2B is an illustrative diagram of the centralized UDM entity and the localized UDM entity configured to communicate with the centralized UDM, where the localized UDM is embodied in a gateway or other suitable component in a mobile edge computing (MEC) environment, according to some implementations of the present disclosure.

FIG. 2B is an illustrative diagram of a system 250 which includes the centralized UDM entity 202 and the localized UDM entity 206 configured for communications with the centralized UDM entity 202 according to some implementations. In FIG. 2B, centralized UDM entity 202 is connected to a core network (e.g. a 5G core network). Localized UDM entity 206 is embodied in a gateway 218 or other suitable component of a network 214 (e.g. a wireless network having a base station (eNodeB or eNB, gNodeB or gNB) or access point 215, etc.). In more specific implementations, localized UDM entity 206 may be provided at the edge of the network 214 for mobile edge computing (MEC), embodied as a virtual network function (VNF) or network function virtualization (NFV) entity in gateway 218.

Also shown in FIG. 2B is an operational support system (OSS) and/or a business support system (BSS) 275 connected in the network. OSS/BSS 275, as well as other entities, may interface and communicate with centralized UDM entity 202 and make changes to data managed by centralized UDM entity 202.

Figure 3:
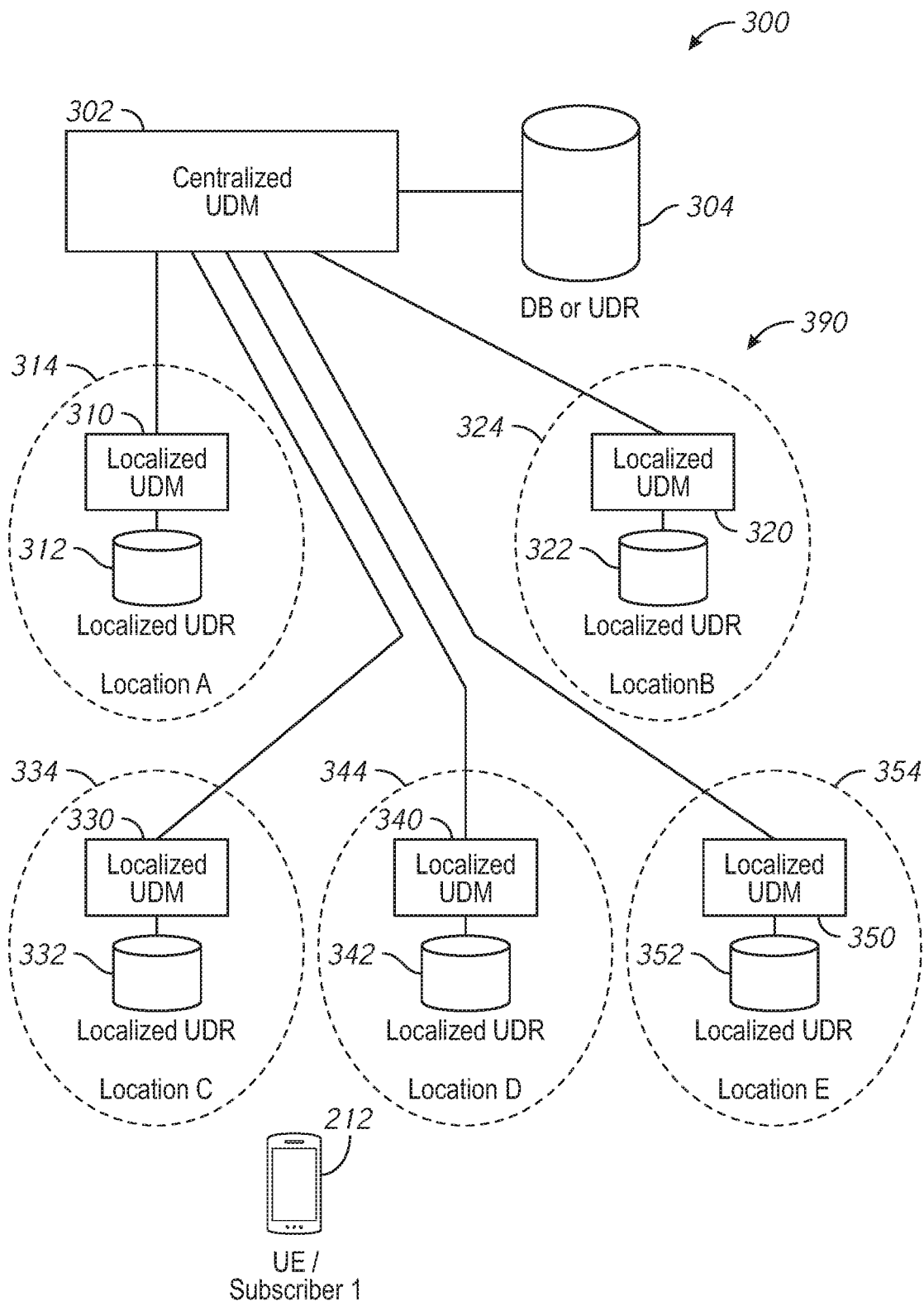
FIG. 3 is an illustrative diagram of a centralized UDM and a plurality of localized UDMs, where each localized UDM is configured to communicate with the centralized UDM and is associated with a unique location area, according to some implementations of the present disclosure.

FIG. 3 is an illustrative diagram of an illustrative portion of a system 300 which includes a centralized UDM 302 configured to connect with a plurality of localized UDMs 390. Each one of localized UDMs 390 is configured for communications with the centralized UDM 302 and is associated with a unique location area. Specifically in FIG. 3, the plurality of localized UDMs 390 are shown to include a localized UDM 310 having a localized UDR 312 provided for operation in location A defined by an area 314, a localized UDM 320 having a localized UDR 322 provided for operation in location B defined by an area 324, a localized UDM 330 having a localized UDR 332 provided for operation in location C defined by an area 334, a localized UDM 340 having a localized UDR 342 provided for operation in location D defined by an area 344, and a localized UDM 350 having a localized UDR 352 provided for operation in location E defined by a location area 354. Note that operation in such a system 300 is described later in relation to FIGS. 8A-8E.

Figure 4A:
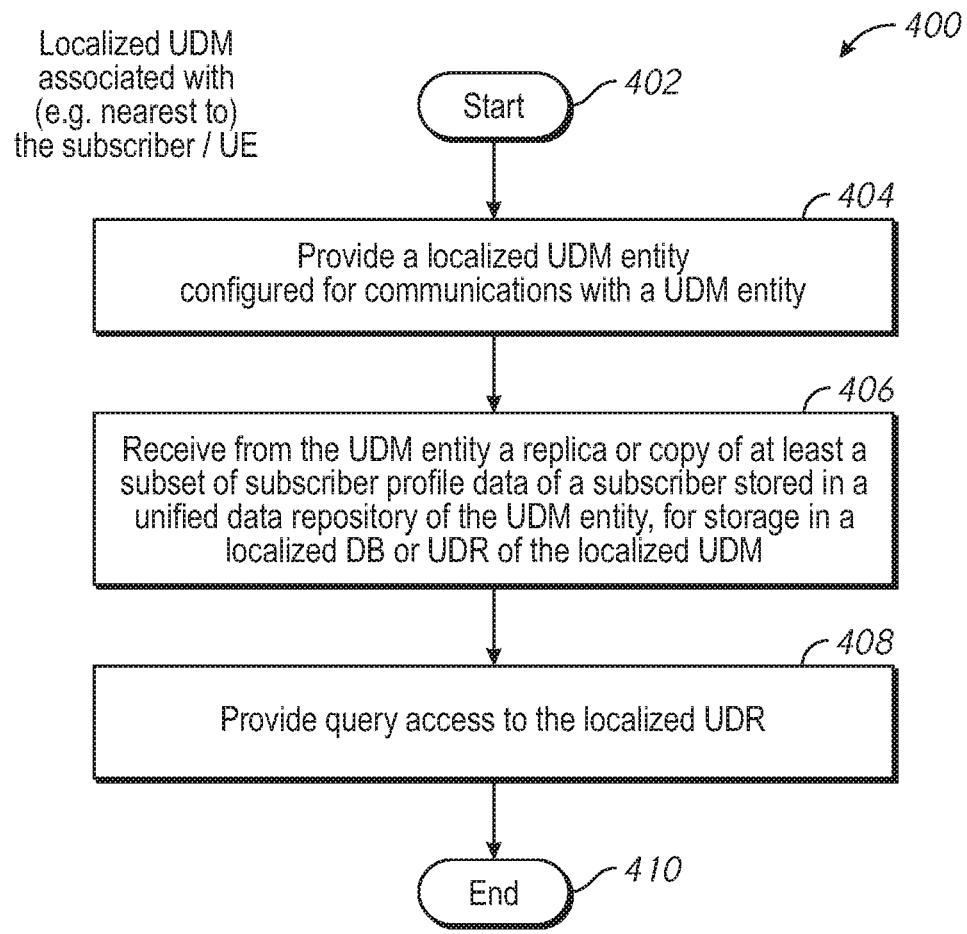
FIG. 4A is a flowchart of a basic method for use in providing a reduced latency in communications associated with use of a centralized UDM, using a localized UDM, according to some implementations of the present disclosure.

FIG. 4A is a flowchart 400 of a method for use in reducing latency in communications associated with use of a centralized UDM entity in a mobile network. The method of FIG. 4A makes use of a localized UDM entity associated with a location area. The method of FIG. 4A (as well as the method continuing in relation to FIGS. 4B, 4C, and 4D) may be executed by an NF, or in a server or network device (e.g. a gateway). The methods may also be embodied as a computer program product including a non-transitory computer readable medium and instructions (e.g. instructions provided in a VNF module) stored in the non-transitory computer readable medium, where the instructions are executable on one or more processors of the server or network device for performing the steps of the method.

Beginning at a start block 402 of FIG. 4A, a localized UDM entity configured for communications with a UDM is provided (step 404 of FIG. 4A). The localized UDM entity may receive, from the UDM entity, a replica or copy of at least a subset of subscriber profile data of a subscriber stored in a Unified Data Repository (UDR) of the UDM entity (step 406 of FIG. 4A). The replica or copy is for storage in a localized database (DB) or UDR of the localized UDM. The localized UDM entity may provide query access to the localized UDR for NFs or subscriber/UEs in the mobile network (step 408 of FIG. 4A). The flowchart ends at an end block 410 of FIG. 4A.

Note that the method of FIG. 4A may be performed for each one of a plurality of subscribers/UEs, where the subscriber/UE is determined or identify to have a frequent or substantial use in the location area. Note further that the method of FIG. 4A may be performed for each one of a plurality of localized UDMs, where each localized UDM is associated with a unique location area.

Thus, at a UDM entity according to some implementations of the present disclosure, at least a subset of subscriber profile data for a subscriber of a UE stored in the UDR is sent to a localized UDM entity for storage in a localized UDR, where the localized UDM entity is associated with a location area where the subscriber has actual, frequent, or substantial use.

Figure 4B:
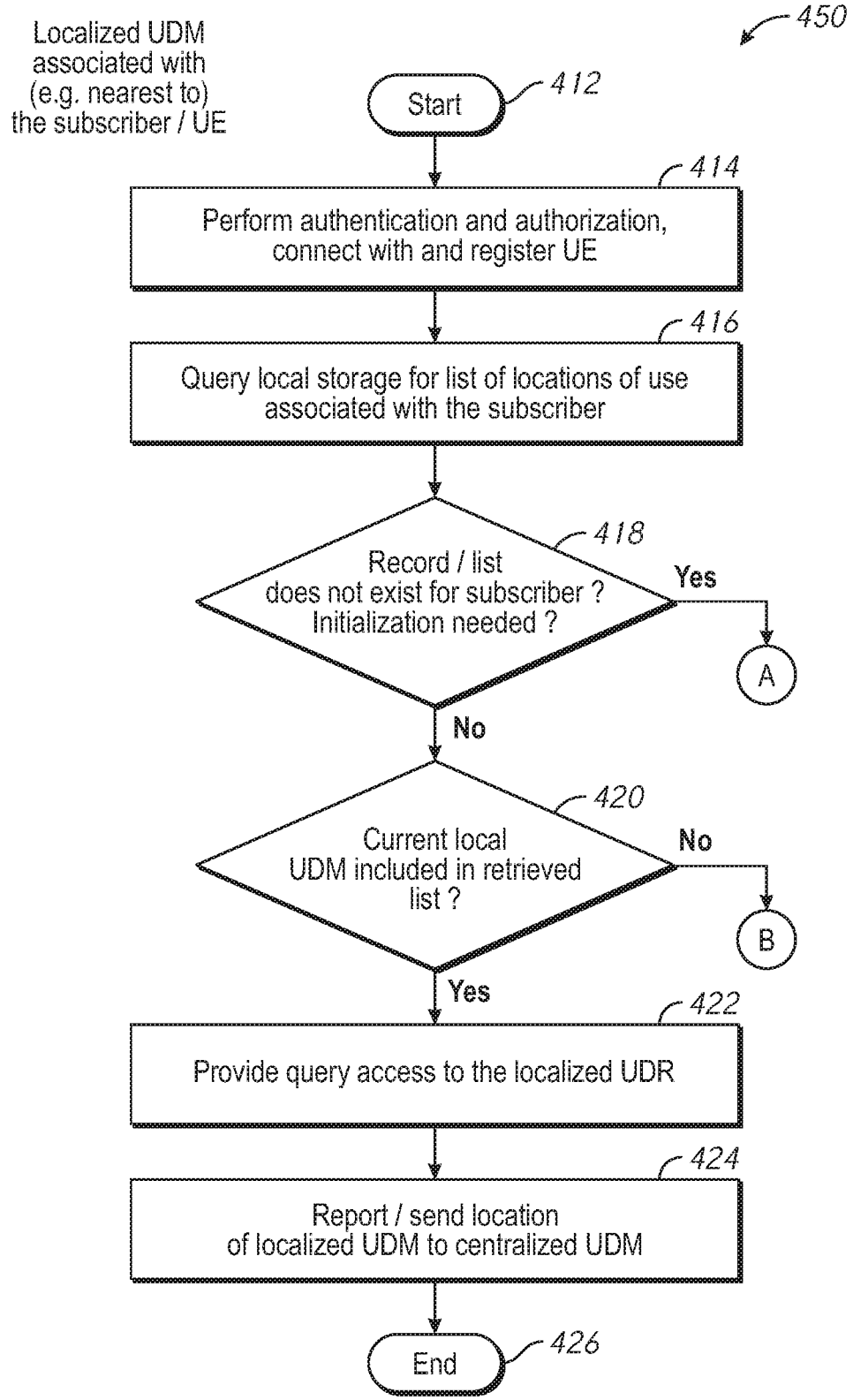
FIG. 4B is a flowchart of a continuation of the method of FIG. 4A which is performed by a localized UDM configured to communicate with the centralized UDM, according to some implementations.

FIG. 4B is a flowchart 450 of a method which is a continuation of the method of FIG. 4A, for use in reducing latency in communications associated with use of the centralized UDM. Again, the method of FIG. 4B makes use of a localized UDM associated with a location area. In addition, or alternatively, the method of FIG. 5 may be executed by an NF, and/or in a server or network device (e.g. gateway). The method may also be embodied as a computer program product including a non-transitory computer readable medium and instructions (e.g. instructions provided in a VNF module) stored in the non-transitory computer readable medium, where the instructions are executable on one or more processors of the server or network device for performing the steps of the method.

Beginning at a start block 412 of FIG. 4B, the localized UDM performs authentication and authorization of the subscriber/UE prior to connecting with and registering the UE (step 414 of FIG. 4B). If authorization is unsuccessful, the method terminates. If authentication is successful, the localized UDM queries local storage for a list of locations of use associated with the subscriber (step 416 of FIG. 4B). It is identified whether a record or list associated with the subscriber/UE exists (step 418 of FIG. 4B). If the record or list does not exist as identified in step 418 ("Yes" branch of step 418), this indicates that initialization is needed where the method continues through a connector A to the method of FIG. 4C.

If the record or list associated with the subscriber/UE is identified to exist in step 418 ("No" branch of step 418), then the localized UDM identifies whether the retrieved list includes a location associated with the current localized UDM (step 420 of FIG. 4B). If the retrieved list does not include the location associated with the current localized UDM in step 420 ("No" branch in step 420), the method continues through a connector B to the method of FIG. 4D.

If the retrieved list of locations of use of the subscriber includes the location associated with the current localized UDM in step 420 ("Yes" branch in step 420), the localized UDM provides query access to the localized UDR for NFs or the subscriber (step 422 of FIG. 4B). The localized UDM reports or otherwise sends to the centralized UDM the location associated with the localized UDM (step 424 of FIG. 4B). The flowchart of FIG. 4B ends at an end block 426 of FIG. 4B.

The localized UDM reports or sends a location of the localized UDM to the centralized UDM (step 418 of FIG. 4B). The reporting of the location is for use in creating, determining, and/or modifying a list of locations of use (e.g. frequent or substantial use) of the subscriber/UE by the centralized UDM. The method ends at an end block 420 of FIG. 4B.

Note that location information referred to herein may be defined by one or more identifiers, including one or more identifiers of a geographic location, an identity or name of an entity (e.g. the identity or name of the localized UDM), or an address of an entity (e.g. the address of the localized UDM). Location may be indicated or defined by one or more identifiers, including any one of or any one or more combinations of identifiers including a cell identity (ID), a Cell Global Identification (eCGI), a Tracking Area Code (TAC), a Location Area Code (LAC), a Routing Area Code (RAC), and a Mobile Edge Computing (MEC) identifier.

Figure 4C:
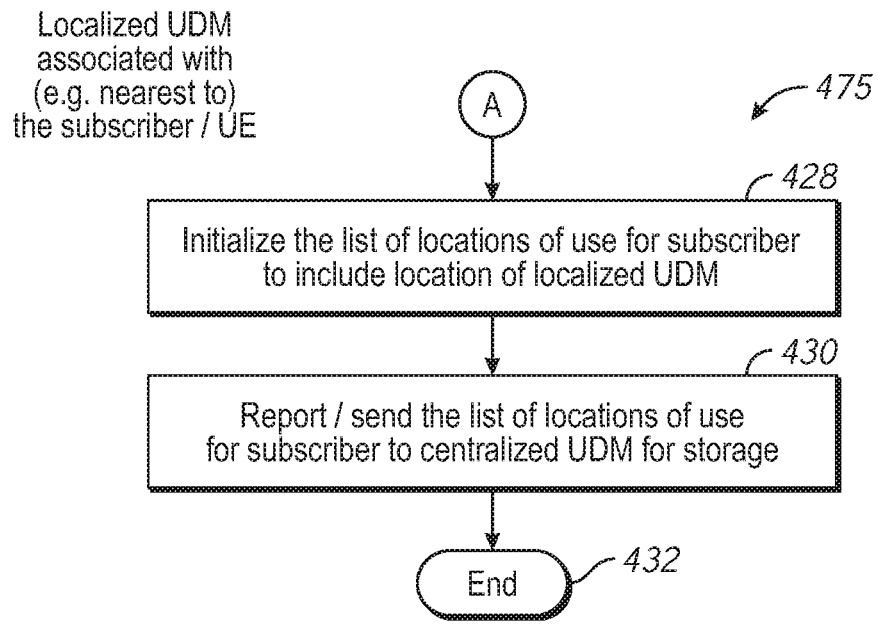
FIG. 4C is a flowchart of a continuation of the method of FIGS. 4A and 4B which is performed by the localized UDM, according to some implementations.

FIG. 4C is a flowchart 475 of a method which is a continuation of the method of FIG. 4B, for use in reducing latency in communications associated with use of the centralized UDM. The method continues via connector A of FIG. 4B where it was identified that a record or list did not exist for the subscriber/UE in the localized UDR (previous step 418 of FIG. 4B). In response to the non-existent record, the localized UDM initializes a list of locations of use for the subscriber/UE, to add or include the location of the current localized UDM (step 428 of FIG. 4C). The list of locations of use for the subscriber/UE is reported or otherwise sent to the centralized UDM for storage (step 430 of FIG. 4C). The reporting of the location is for use in creating, determining, and/or modifying a list of locations of use (e.g. frequent or substantial use) of the subscriber/UE by the centralized UDM (see e.g. FIGS. 5 and 6). The method ends at an end block 432 of FIG. 4C.

Figure 4D:
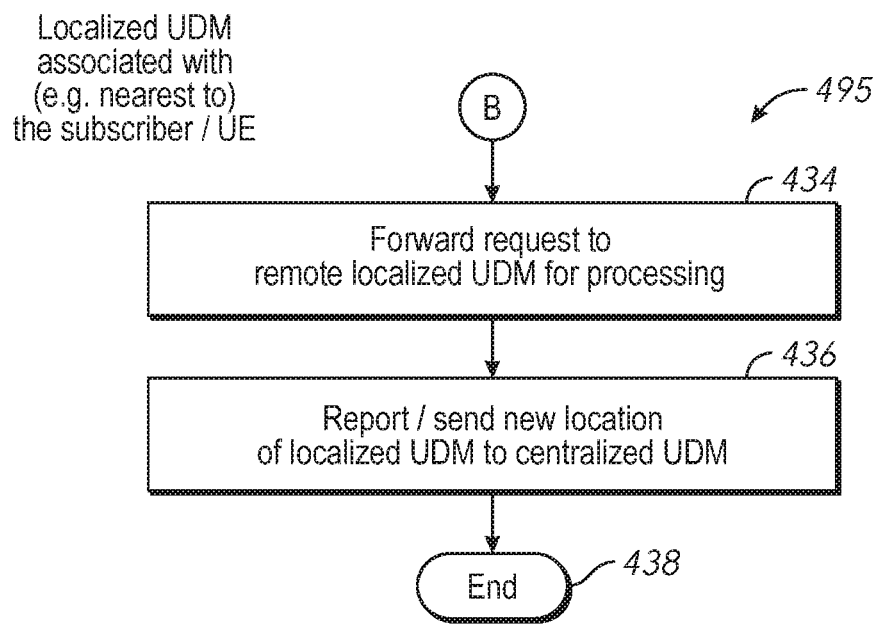
FIG. 4D is a flowchart of a continuation of the method of FIGS. 4A, 4B, and 4C which is performed by the localized UDM, according to some implementations.

FIG. 4D is a flowchart 495 of a method which is a continuation of the method of FIG. 4B, for use in reducing latency in communications associated with use of the centralized UDM. The method continues via connector B of FIG. 4B, where it was identified that the location of the current localized UDM was not included in the list of locations of use of the subscriber (previous step 420 of FIG. 4B). In response, the localized UDM forwards the request of the subscriber to the previous, remote localized UDM for processing (step 434 of FIG. 4D). The location of the current localized UDM is reported or otherwise sent to the centralized UDM for storage (step 436 of FIG. 4C). The reporting of the location is for use in creating, determining, and/or modifying a list of locations of use (e.g. frequent or substantial use) of the subscriber/UE by the centralized UDM (see e.g. FIGS. 5 and 6). The method ends at an end block 438 of FIG. 4D.

Figure 5:
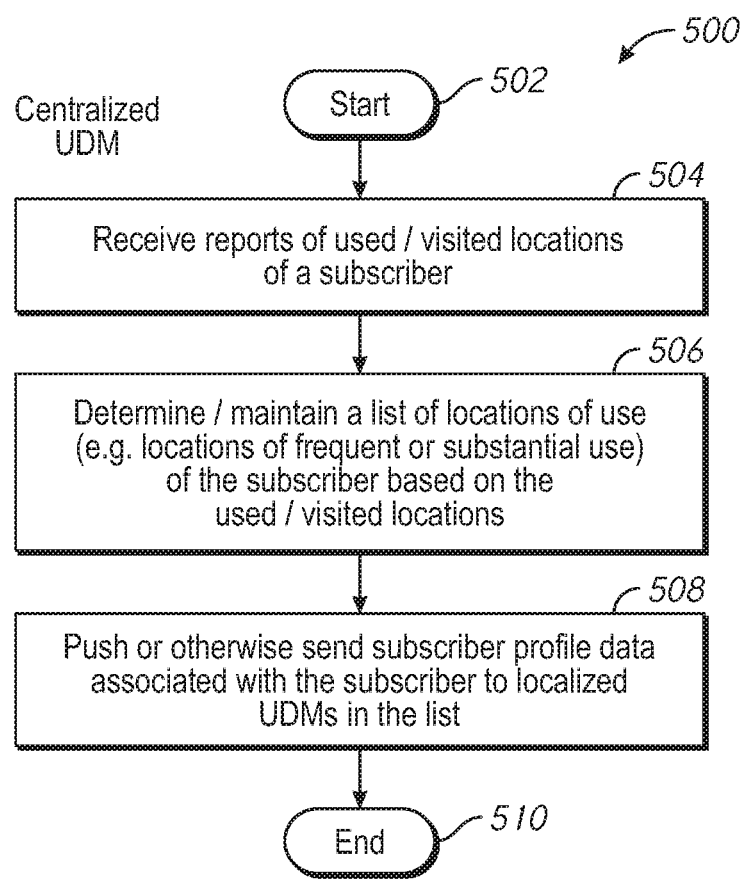
FIG. 5 is a method for use in a centralized UDM for providing reduced latency in communications associated with use of the centralized UDM, where the centralized UDM is configured to determine and maintain a list of locations of use for a subscriber and push or otherwise send subscriber profile data associated with the subscriber to the locations associated with localized UDMs in the list, according to some implementations.

FIG. 5 is a flowchart 500 of a method for use in reducing latency in communications associated with use of a centralized UDM. The method of FIG. 5 may be embodied in a centralized UDM of a mobile network, and performed in association with one or more localized UDMs, each associated with a unique location area. In addition, or alternatively, the method of FIG. 5 may be executed by an NF, and/or in a server or network device. The method may also be embodied as a computer program product including a non-transitory computer readable medium and instructions stored in the non-transitory computer readable medium, where the instructions are executable on one or more processors of the server or network device for performing the steps of the method.

Beginning at a start block 502 of FIG. 5, the centralized UDM receives a plurality of reports of used or visited locations of a subscriber or UE (step 504 of FIG. 5). The centralized UDM may receive these reports from one or more localized UDMs in communication with the UE over a time period (e.g. a moving time window). The centralized UDM determines a list of locations of use of the subscriber or UE (e.g. locations of frequent or substantial use) based on the received used or visited locations of the subscriber or UE over the time period (step 506 of FIG. 5). This determined list of locations of use may be maintained in memory or DB of the centralized UDM, and updated as needed. A replica or copy of subscriber profile data stored in the centralized UDM DB and associated with the subscriber or UE is push or otherwise sent to each one of the one or more localized UDMs included in the determined list of locations of use (step 508 of FIG. 5). The flowchart of FIG. 5 ends at an end block 510 of FIG. 5, although it may be repeated by the centralized UDM in relation to each one of a plurality of subscribers or UEs in the mobile network.

Figure 6:
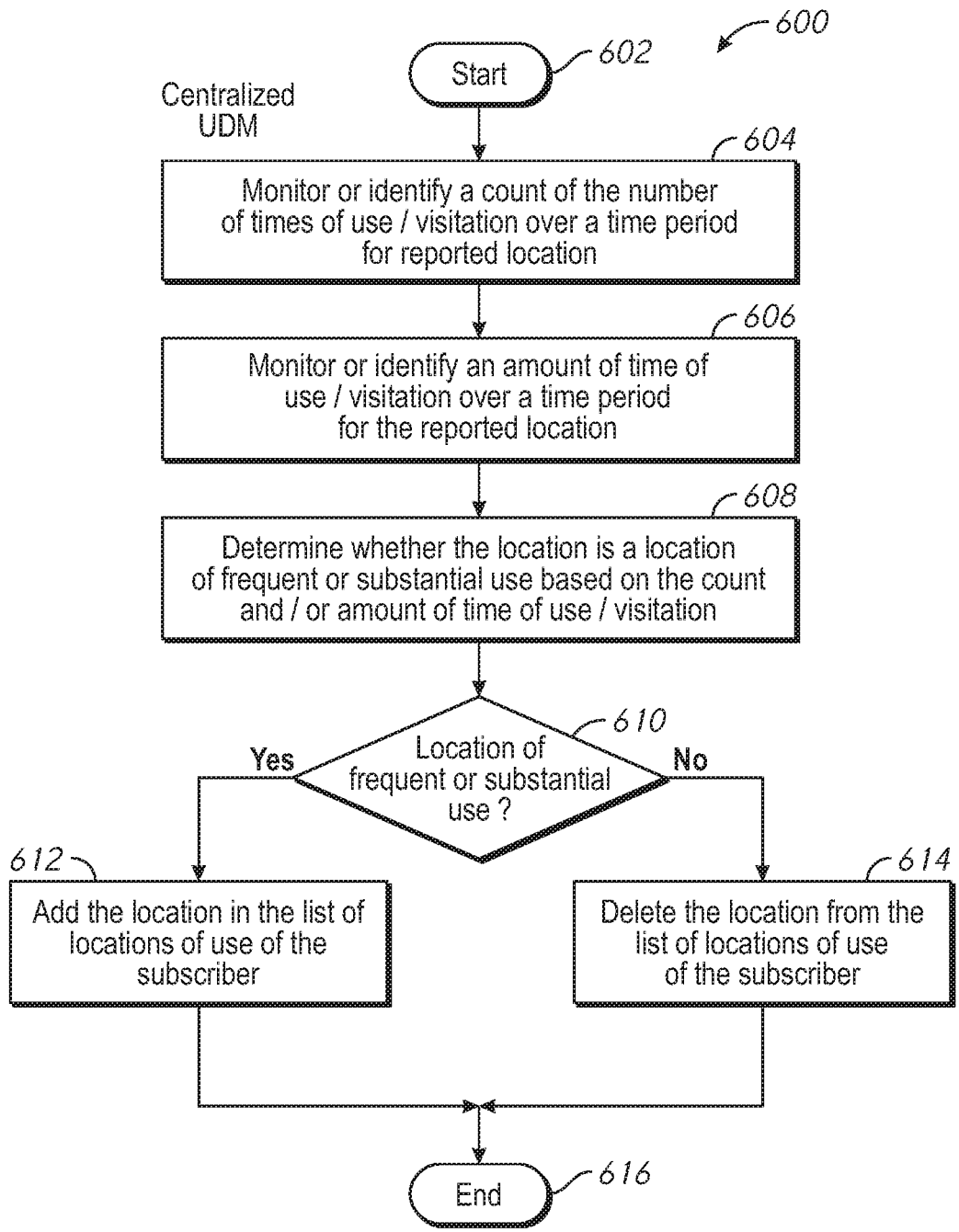
FIG. 6 is a method for use in a centralized UDM for providing reduced latency in communications associated with use of the centralized UDM, where the centralized UDM is configured to determine whether a visited location of the subscriber is to be added or deleted from its list of locations of use, according to some implementations.

FIG. 6 is a flowchart 600 of a method for use in reducing latency in communications associated with use of a centralized UDM. The method of FIG. 6 is an example of a way in which to perform step 506 of FIG. 5. The method of FIG. 6 may be embodied in a centralized UDM of a mobile network, and performed in association with one or more localized UDMs, each associated with a unique location area. The method of FIG. 6 may be provided in a server or network device. The method may also be embodied as a computer program product including a non-transitory computer readable medium and instructions stored in the non-transitory computer readable medium, where the instructions are executable on one or more processors of the server or network device for performing the steps of the method.

Beginning at a start block 602 of FIG. 6, the centralized UDM may monitor and/or identify a count of the number of times of use or visitation of a location for a subscriber or UE over a time period (step 604 of FIG. 6). The centralized UDM may monitor and/or identify an amount of time of use or visitation of the location for the subscriber or UE over the time period (step 606 of FIG. 6). The count and/or the amount of times identified in steps 604 and 606 may be identified by the locations reported by a plurality of localized UDMs (see e.g. step 504 of FIG. 5). The centralized UDM may determine whether the location is a location of frequent or substantial use based on the count and/or amount of time of use or visitation of the location (step 608 of FIG. 6). It is identified whether the location is determined to be a location of frequent or substantial use (step 610 of FIG. 6) and, if so, then the location is added to the list of locations of use of the subscriber or UE (step 612 of FIG. 6). If the location is identified not to be a location of frequent or substantial use in step 610 (e.g. it is a location of infrequent and/or insubstantial use), then the location is deleted from the list of locations of use of the subscriber or UE (step 614 of FIG. 6) (i.e. if the location exists in the list). The flowchart ends at an end block 616 of FIG. 6.

Figure 7:
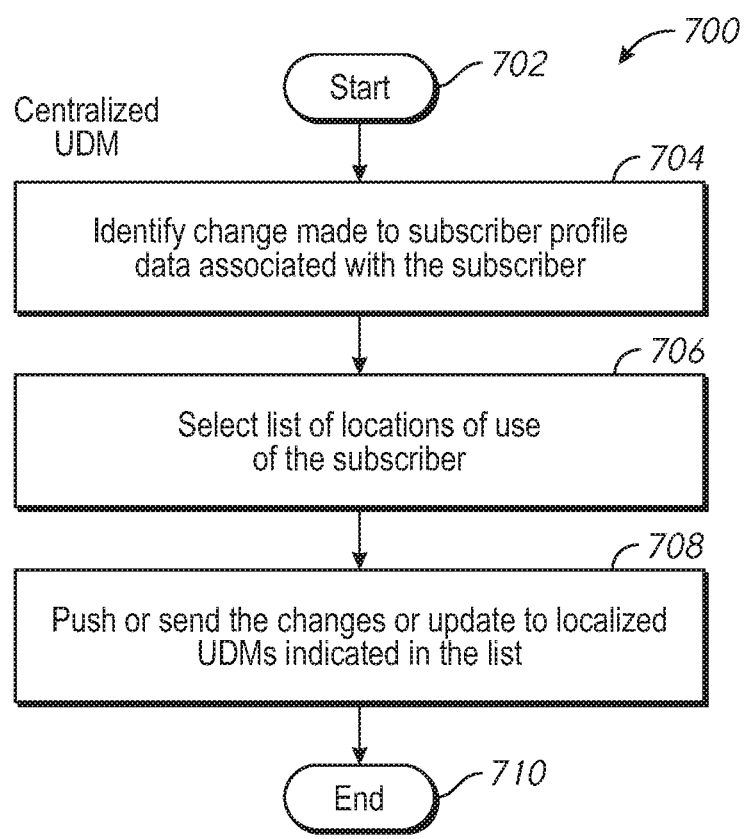
FIG. 7 is a method for use in a centralized UDM for providing reduced latency in communications associated with use of the centralized UDM, where the centralized UDM is configured to identify changes made to subscriber profile data of a subscriber and to push or otherwise send subscriber profile data associated with the subscriber to the locations associated with localized UDMs in the list, according to some implementations.

FIG. 7 is a flowchart 700 of a method for use in reducing latency in communications associated with use of a centralized UDM. The method of FIG. 7 may be embodied in the centralized UDM of a mobile network, and performed in association with one or more localized UDMs, each one being associated with a unique location area. The method of FIG. 7 may be provided in a server or network device. The method may also be embodied as a computer program product including a non-transitory computer readable medium and instructions stored in the non-transitory computer readable medium, where the instructions are executable on one or more processors of the server or network device for performing the steps of the method.

Beginning at a start block 702 of FIG. 7, the centralized UDM identifies that a change has been made to subscriber profile data stored in the centralized UDM DB (step 704 of FIG. 7). In response to the identification, the centralized UDM selects a stored listed of locations of use of the subscriber that is associated with the changed subscriber profile data (step 706 of FIG. 7). The centralized UDM may push or otherwise send the changes or updates (i.e. the "delta") to one or more (e.g. some or all) of the localized UDMs in the selected, stored list of locations of use (step 708 of FIG. 7). The flowchart ends at an end block 710 of FIG. 7.

FIGS. 8A-8E are illustrative diagrams of system 300 of FIG. 3 described earlier, including centralized UDM 302 and the plurality of localized UDMs 390. Each localized UDM 390 is configured for communications with centralized UDM 302 and is associated with a unique location area which may be visited by a subscriber according to some implementations.

Figure 8A:
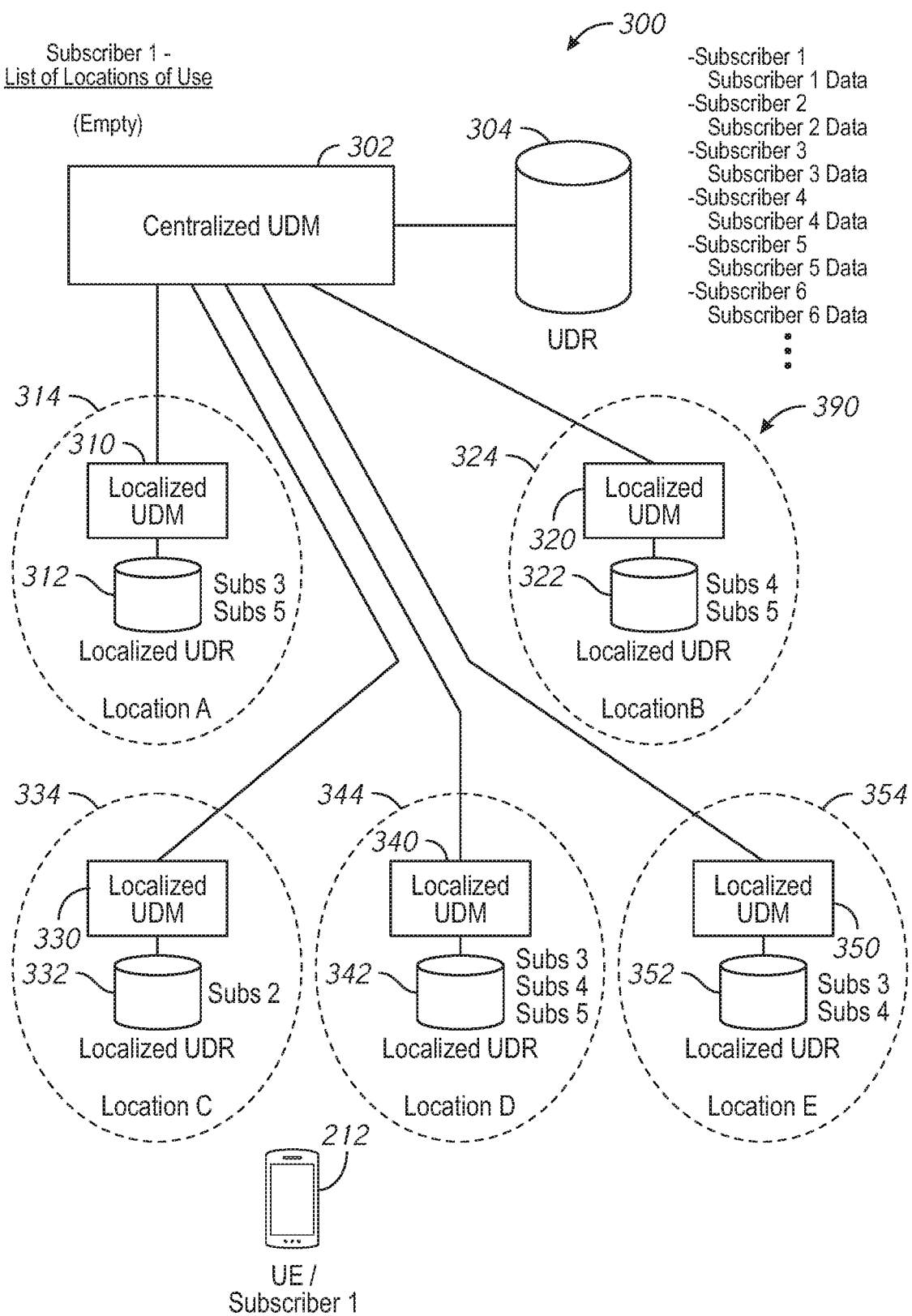
FIGS. 8A-8E are illustrative diagrams of a centralized UDM and a plurality of localized UDMs, where each localized UDM is configured to communicate with the centralized UDM and is associated with a unique location area which may be visited by a subscriber, according to some implementations.

Illustrative operation of system 300 in relation to FIGS. 8A-8E is now described. In FIG. 8A, it is shown that UE 212 is associated with subscriber 1. The list of locations of use for subscriber 1 is indicated to be empty. Centralized UDM DB 304 includes subscriber profile data for most or all subscribers in the network, including for each one of subscribers 1 through 6. On the other hand, each one of localized UDRs 390 are for storing subscriber profile data for a subset of the subscribers, including a subscriber profile data for those subscribers that use or visit the location (e.g. a frequent or substantial use of the location).

In the example of FIG. 8A, it is indicated that localized UDR 312 at location A includes subscriber profile data for subscriber 3 and subscriber profile data for subscriber 5. In addition, localized UDR 322 at location B includes subscriber profile data for subscriber 4 and subscriber profile data subscriber 5. Localized UDR 332 at location C includes subscriber profile data for subscriber 2. Localized UDR 342 at location D includes subscriber profile data for subscriber 3, subscriber profile data for subscriber 4, and subscriber profile data for subscriber 5. Localized UDR 352 at location E includes subscriber profile data for subscriber 3 and subscriber profile data for subscriber 4.

Figure 8B:
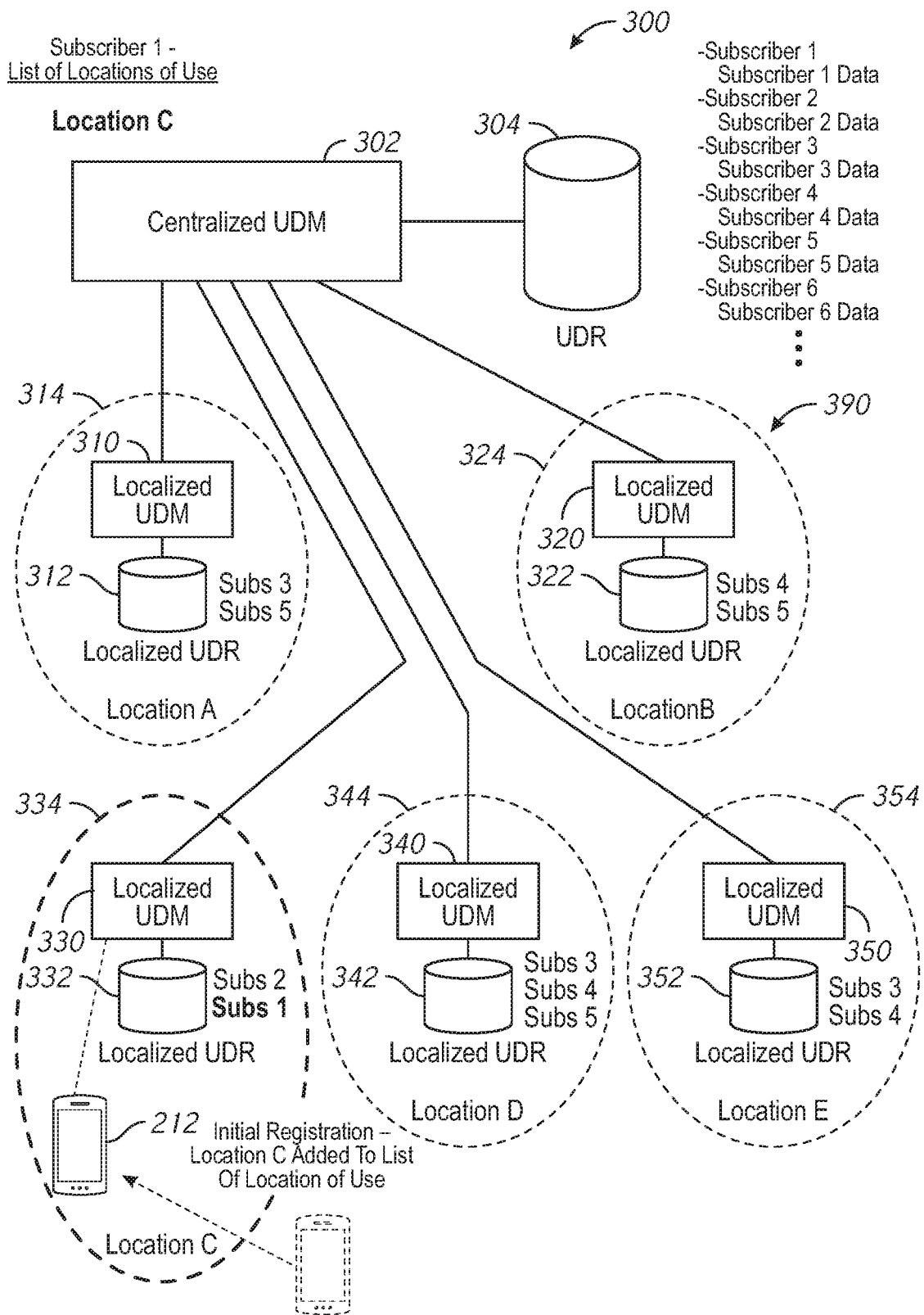

In FIG. 8B, it is shown that UE 212 is moved to location C where localized UDM 330 will perform registration with UE 212. Localized UDM 330 will perform the method of FIG. 4B with FIG. 4C, where localized UDM 330 initializes the list of locations of use for subscriber 1. In the initialization of the list, location C is added to the list of locations of use for subscriber 1, as indicated. Localized UDM 330 will receive subscriber profile data for subscriber 1 from centralized UDM 302 and store it in its localized UDR 332 as indicated.

Figure 8C:
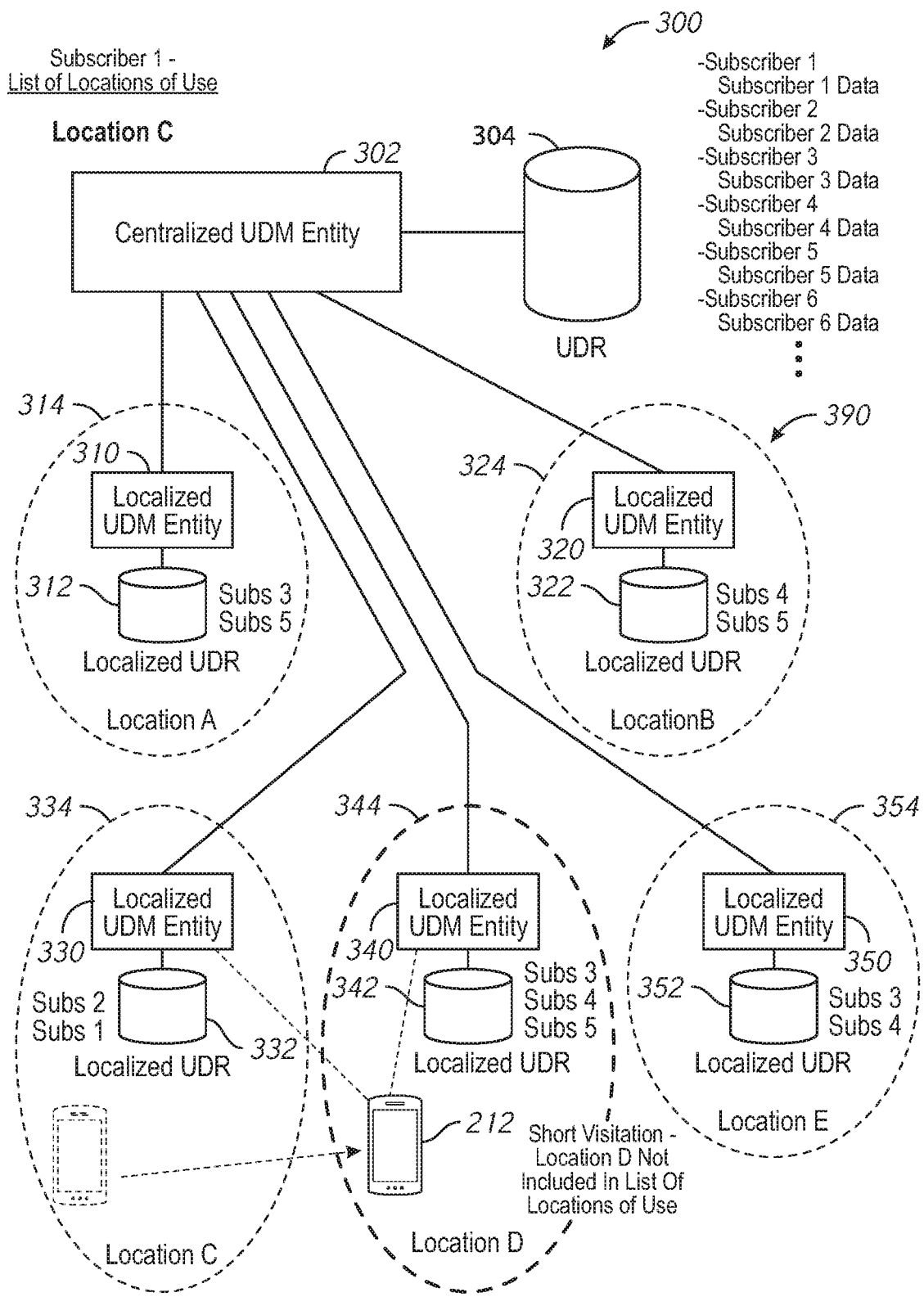

In FIG. 8C, it is shown that UE 212 is moved from location C to location D, where localized UDM 340 will attempt to register UE 212. Localized UDM 340 will perform the method of FIG. 4B with FIG. 4D, where localized UDM 340 forwards the request for processing by previous, remote localized UDM 330 in location C. As UE 212 has a short visitation in location D, location D is not added to the list of locations of use for subscriber 1, nor does localized UDM 340 receive any subscriber profile data for subscriber 1

Figure 8D:
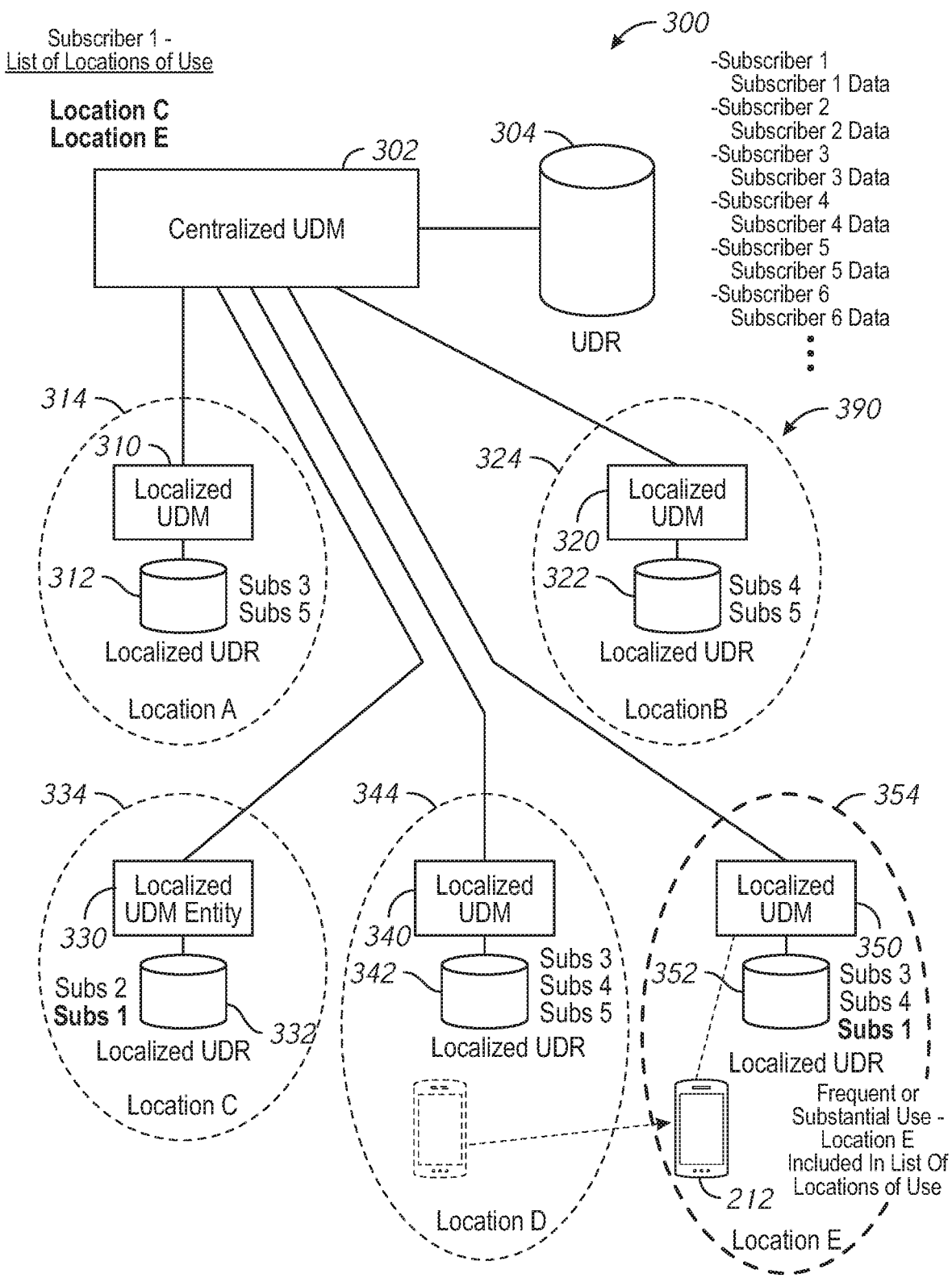

In FIG. 8D, it is shown that UE 212 is moved from location D to location E where localized UDM 350 will perform registration with UE 212. It is assumed that, at least eventually, UE 212 has a frequent or substantial use or visitation in location E. Therefore, location E will be added to the list of locations of use for subscriber 1, as indicated. Also, localized UDM 330 will receive subscriber profile data for subscriber 1 from centralized UDM 302 and store it in its localized UDR 352 as indicated. Here, localized UDM 350 will perform the method of FIG. 4B, where localized UDM 350 registers UE 212 and provides query access to localized UDR 352.

Figure 8E:
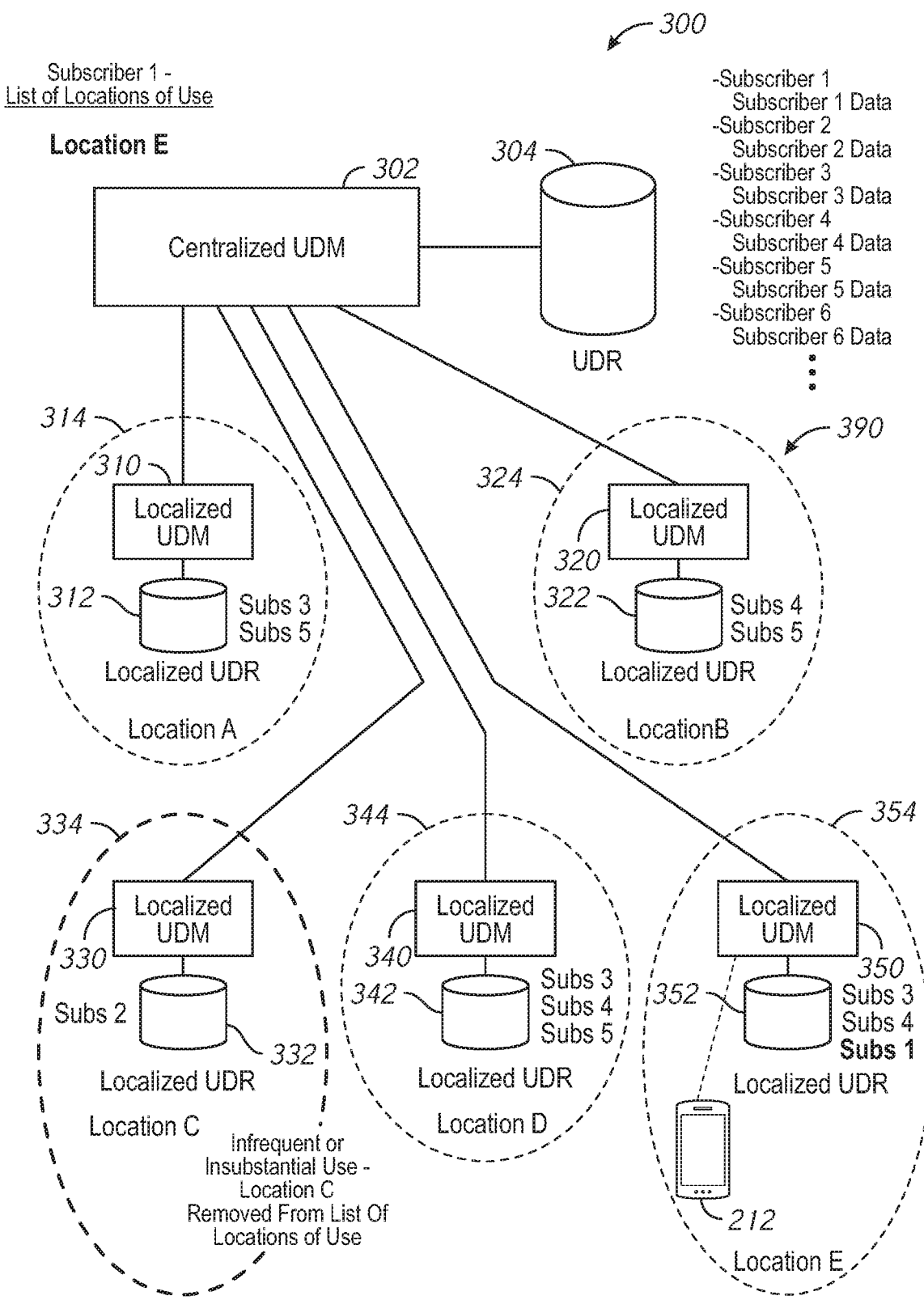

In FIG. 8E, it is shown that UE 212 remains at location E and (over time) fails to ever again visit location C. It is assumed that, at least eventually, UE 212 has an frequent or insubstantial use or visitation in location C. Therefore, location C will be deleted from the list of locations of use for subscriber 1, as indicated. Also, localized UDM 330 will delete subscriber profile data for subscriber 1 from localized UDR 332, as indicated.

Figure 9:
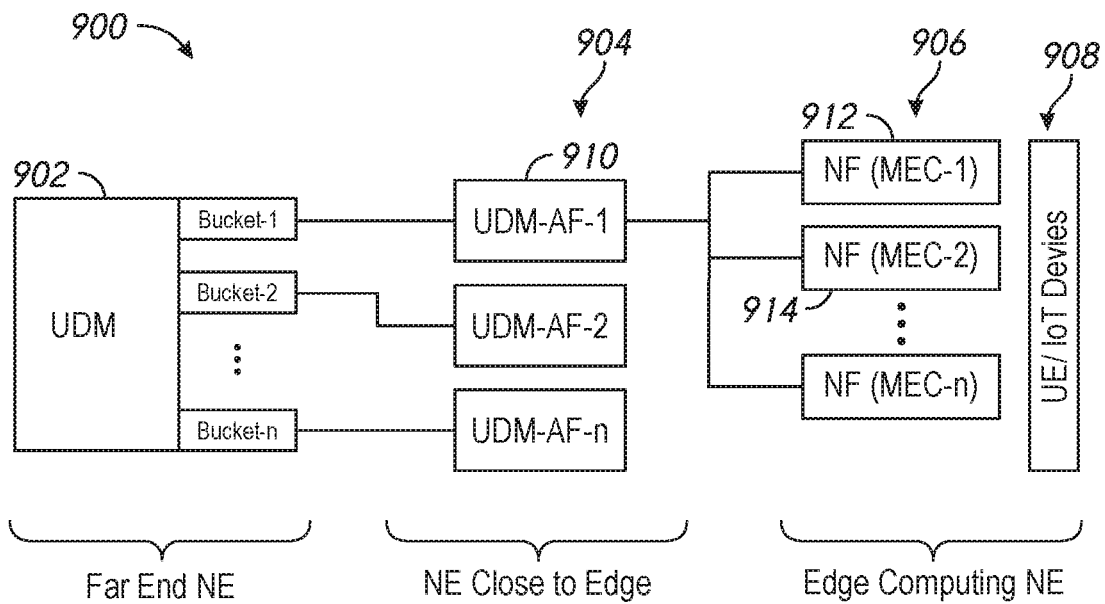
FIG. 9 is an illustrative diagram of a system or network architecture according to some implementations.

Referring now to FIG. 9, an illustrative diagram of a system 900 or network architecture according to some implementations is shown. System 900 is shown to include a centralized UDM 902, a plurality of localized UDMs 904 (shown as UDM-AFs in FIG. 9), and a plurality of network functions (NFs) 906 associated with a plurality of devices 908, such as UEs and IoT devices. As shown, the plurality of localized UDMs 910 may include a localized UDM 910, and NFs 906 may include an NF 912 and an NF 914 for connection with localized UDM 910.

Figure 10:
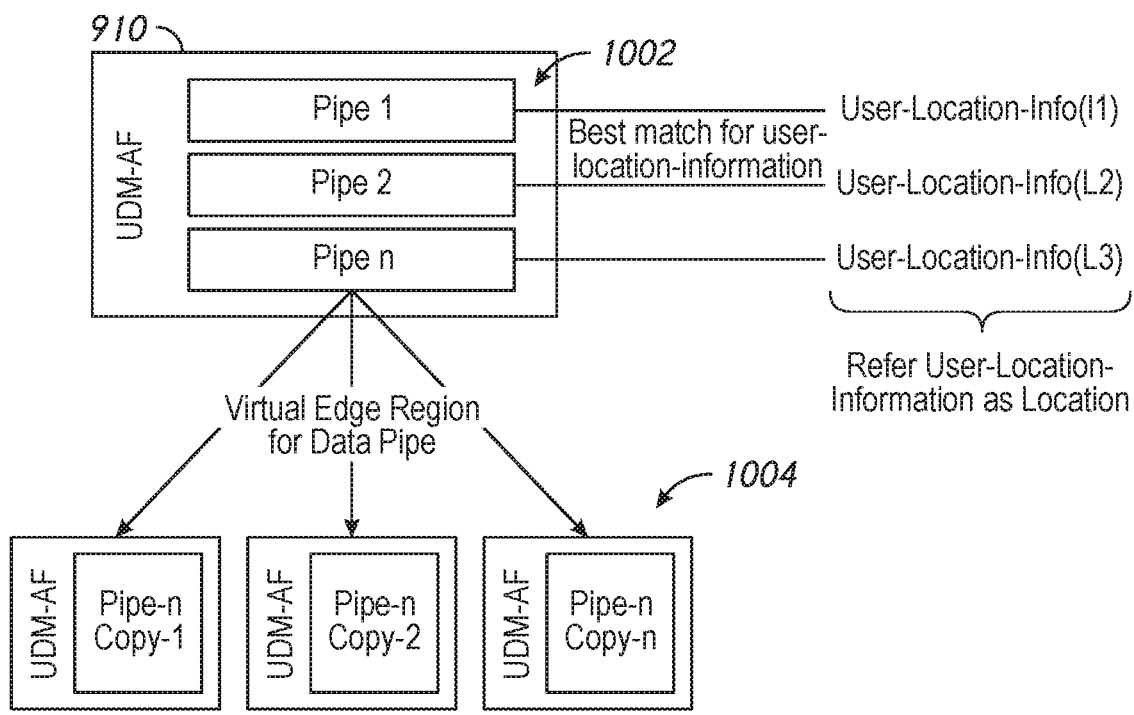
FIG. 10 is an illustrative diagram of the system of FIG. 9, where a plurality of pipes may be implemented in each localized UDM.

FIG. 10 is an illustrative diagram of one of the localized UDMs 910 of FIG. 9, where it is shown that a plurality of pipes 1002 for processing multiple data streams may be implemented. The plurality of pipes 1002 may handle multiple requests from different locations, front-ended by proxy so that an NF may connect to a single endpoint. Detection of any given pipe may be based on a best match for the location(s). Each one of pipes 1002 may provide for one or more copies of data available at a mated/pair localized UDM. These pairs are a result of most recently used (MRU) visited locations.

Figure 11:
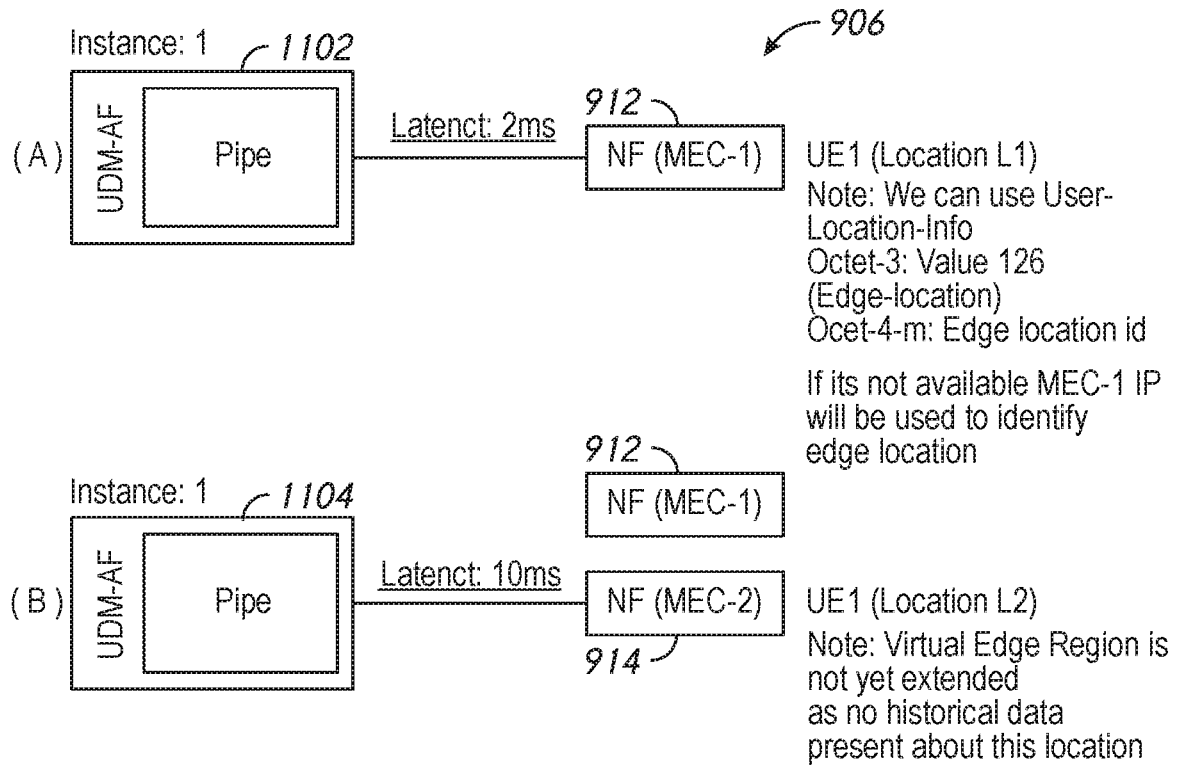
FIGS. 11 and 12 are illustrative diagrams of the system of FIG. 10 for illustrating techniques for reducing latency in communications according to some implementations.
Figure 12:
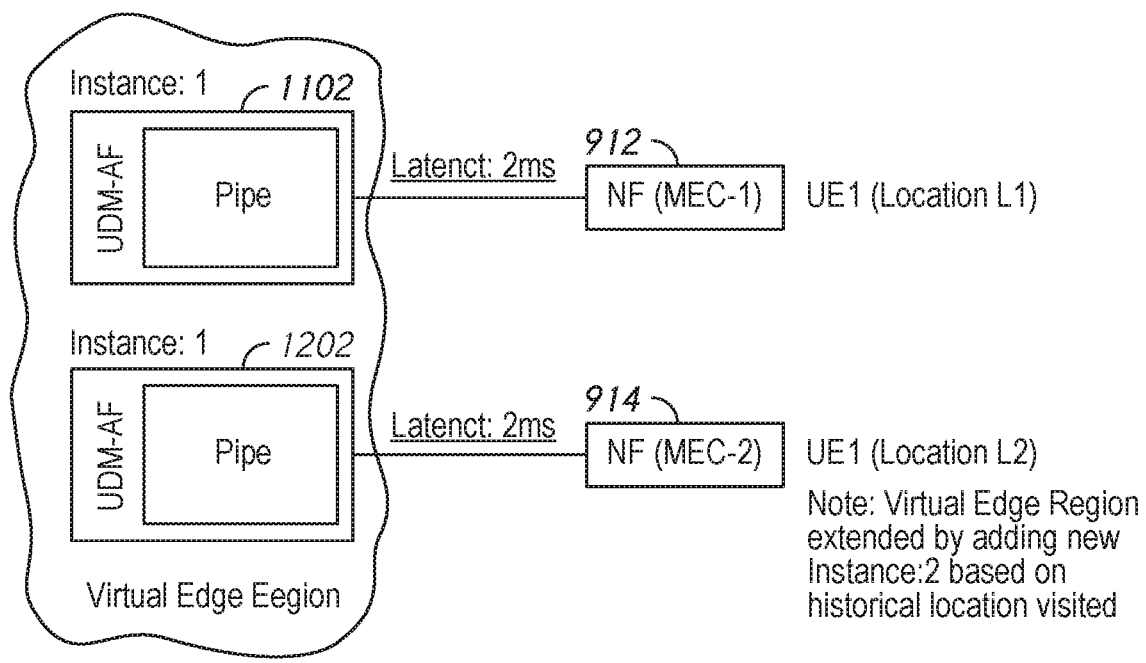

FIGS. 11 and 12 are illustrative diagrams of the system of FIG. 10 for illustrating techniques for reducing latency in communications according to some implementations. In FIG. 11, instance 1 is identified as localized UDM 1102 and as localized UDM 1104, whereas in FIG. 12 instance 1 is identified as localized UDM 1102 and instance 2 is identified as localized UDM 1202.

A localized UDM will self-learn frequently-visited locations for a subscriber, where handover from NF-1 to NF-n are needed. Once a new location is discovered (e.g. based on one-off path or recurrent path) a location is added to the list of locations of use. Thus, multiple copies of data are made selectively available to provide for a Geographically Highly Available (GeoHA) system. In addition, a subscriber connecting for the first time gets a localized UDM as a "serving point," and creates the list of locations of use. The localized UDM will report the new location and wait for any new, additional Virtual EDGE Regions by adding the new member for data served by NF (MEC-2), which reduces latency.

Note that the indicated latencies in FIGS. 11 and 12 are just example indicators for illustrative purposes; real values will depend on the volume of user data, network bandwidth, and other variables.

Figure 13:
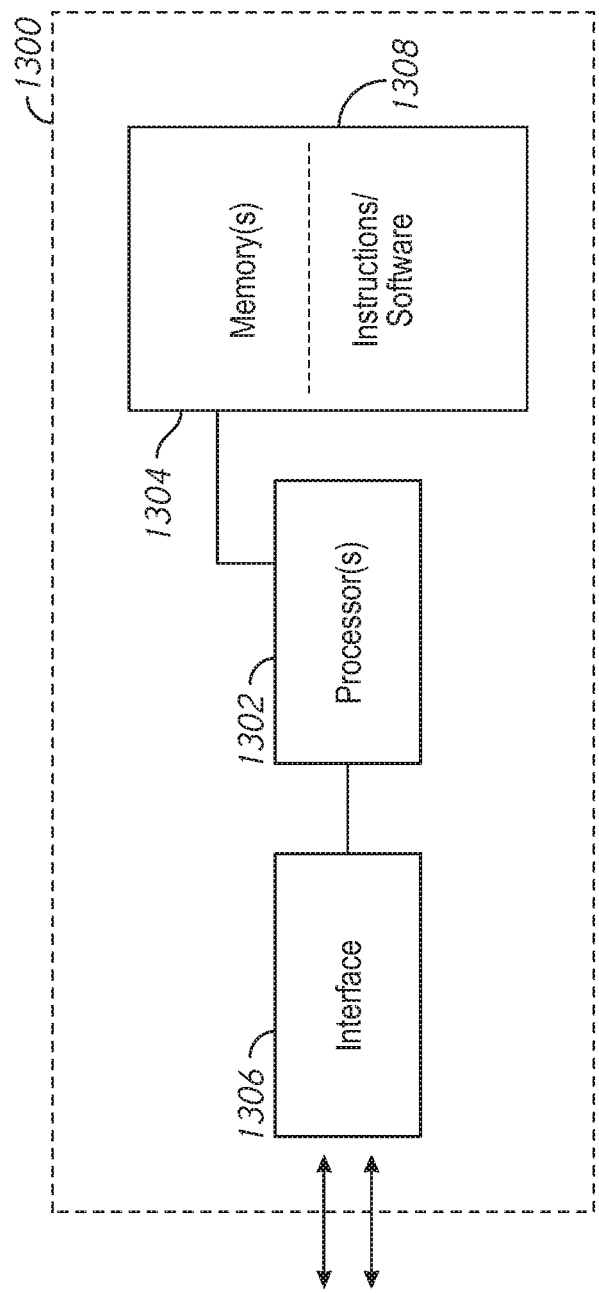
FIG. 13 is a block diagram of a server, component, or network device which may be used in some implementations of the present disclosure.

FIG. 13 is a block diagram of a server, component, or network device 1300 which may be used in some implementations of the present disclosure. Network device 1300 of FIG. 13 has components which may include one or more processors 1302 which are coupled to memory 1304 and to communication interface 1306. Interface 1306 is configured to connect to one or more networks for communications. The one or more processors 1302 of the network device are configured to operate according to instructions 1308 stored in memory 1304, in order to perform basic operations as well as to perform additional techniques of the present disclosure as described above in relation to the Figures.

Managing Operating State Information using a State Aggregation Function (SAF).

Next, methods and apparatus for use in managing operating state information of user equipment (UE) using a state aggregation function (SAF) are described herein.

In one illustrative example of techniques of the present disclosure, a network function (NF) entity having a state aggregation function (SAF) is provided as part of a common slice function in a 5G core network. The NF entity having the SAF includes a database (DB) for storing an aggregate of current operating state information associated with each user equipment (UE) of a plurality of a UEs. Each current operating state information for each UE may indicate a plurality of current operating states (e.g. a mobility state, a session state, and a policy state) associated with each one of a plurality of NFs across each network slice of a plurality of network slices assigned to the UE. The NF entity having the SAF may be configured to provide access to and/or change notifications for the information in the DB of the SAF for NFs across the plurality of network slices.

The NF entity having the SAF may be configured to regularly obtain up-to-date, current operating state information from each NF of the plurality of network slices. In some implementations, the NF entity having the SAF may (regularly) obtain and/or provide current operating state information with use of a publish-subscribe interprocess communication (IPC). The publish-subscribe IPC may involve communicating state event notifications (e.g. changes to operating state) to NFs across the plurality of network slices. In some implementations, the information in the DB of the SAF is safeguarded with use of assigned tokens and an access control list (ACL).

In another illustrative example of techniques of the present disclosure, a plurality of NF entities each having a slice-specific SAF are provided in a 5G mobile network. Each NF entity having a slice-specific SAF is associated with a respective one of a plurality of network slices assigned to a UE. Each NF entity having the slice-specific SAF may include a DB for storing an aggregate of slice-specific current operating state information associated with each UE of a plurality of UEs. Each slice-specific current operating state information may include a plurality of slice-specific current operating states associated with each one of a plurality of NFs in a specific network slice assigned to the UE. Each NF entity having the slice-specific SAF may be configured to provide access to and/or change notifications for the information in the DB of the slice-specific SAF for NFs in the specific network slice.

The NF entity having the slice-specific SAF may be configured to regularly obtain up-to-date, current operating state information from each NF in the specific network slice. In some implementations, the NF entity having the slice-specific SAF may (regularly) obtain and/or provide current operating state information with use of a publish-subscribe IPC. The publish-subscribe IPC may involve communicating state event notifications (e.g. changes to operating state) to NFs in the specific network slice. In some implementations, the information in the DB of the slice-specific SAF is safeguarded with use of assigned tokens and an access control list (ACL).

In some preferred implementations, the NF entity having the SAF as described above may be provided together with the plurality of NF entities each having the slice-specific SAF as described above.

Referring back to FIGS. 1A and 1B of the present disclosure, network architecture 100 for 5G is configured to support network function virtualization (NFV) and network slicing (NS) features. Dynamic scaling of NFs is provided to support potentially billions of subscribers. The introduction of network slicing means that each network slice will have a different set of configurations for NFs within it as well as different scaling needs.

As illustrated in FIG. 1B, NFs such as SMF 120a and UPF 122a of FIG. 1B may be provided as specific instances in a first network slice (e.g. network slice 1). Additional instances of NFs for additional network slices may be provided as well, as illustrated by SMF 120b and UPF 122b provided as additional specific instances in a second network slice (e.g. network slice 2).

In this environment, different PDU sessions of a subscriber may be associated with different network slices, and the NFs in each network slice may manage the state of sessions differently. It has been identified by the inventors that the various states associated with a subscriber or device (e.g. subscriber state, session state) may be widely distributed and duplicated across NFs in various network slices. As is apparent, there is a need for managing the operating state information of UEs in mobile networks, especially 5G mobile networks.

Accordingly, methods and apparatus for use in managing operating state information of UEs using a state aggregation function (SAF) are provided herein. Here, the entities and interfaces of FIGS. 1A and 1B may be configured in accordance with the relevant (evolving) standards, with modification, adaptation, and/or additions provided in accordance with the techniques of the present disclosure.

For managing the operating state information, a network function (NF) entity 1402 having a state aggregation function (SAF) 1404 is provided as a common slice function in a 5G core network. The NF entity 1402 having the SAF 1404 includes a database (DB) 1406 for storing an aggregate of current operating state information associated with each UE of a plurality of UEs.

Figure 14:
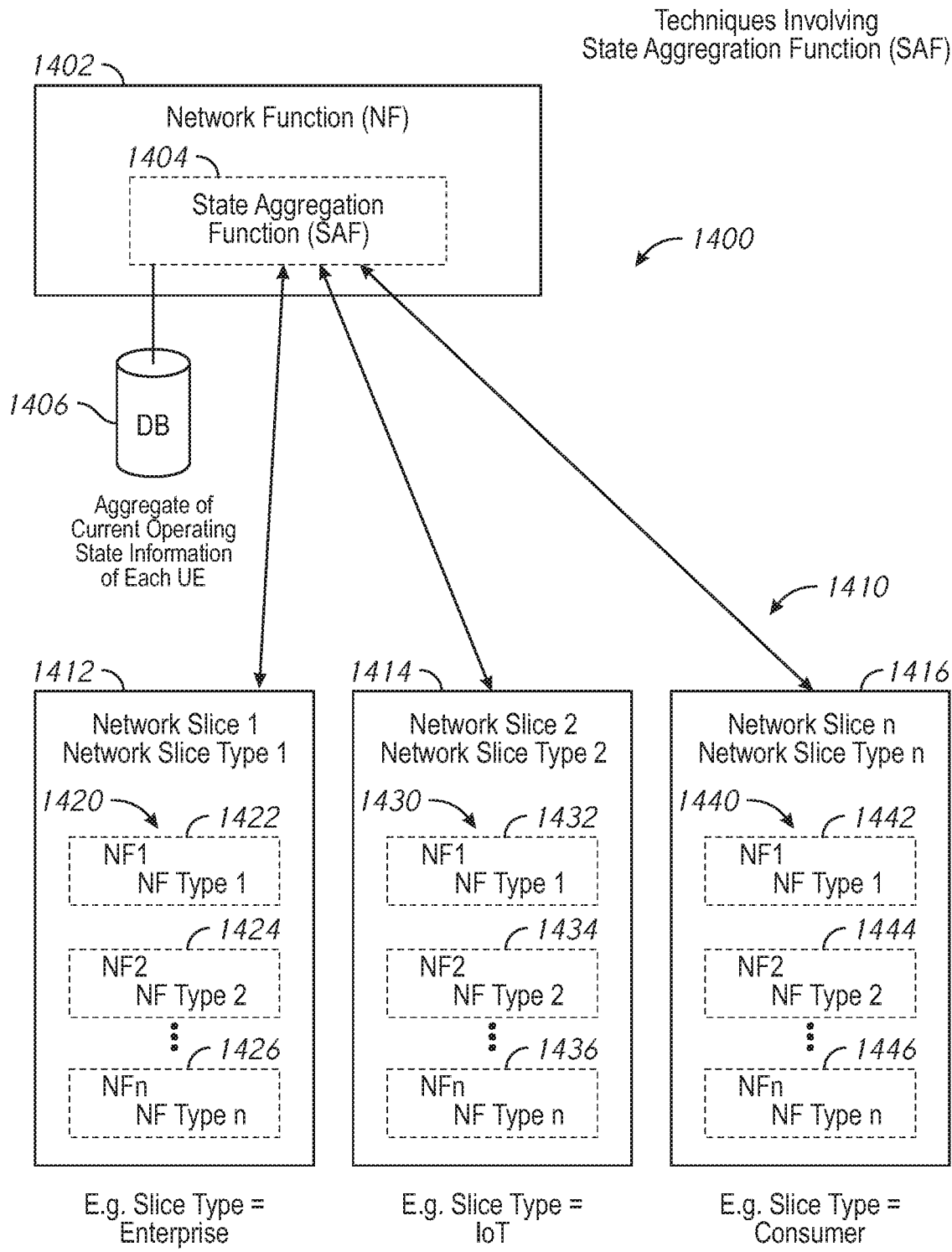
FIG. 14 is a block diagram of pertinent entities in the mobile network for use in managing operating state information of user equipment (UE) using a state aggregation function (SAF) having a database (DB) according to some implementations of the present disclosure.

In the mobile network, a plurality of network slices 1410 may be assigned to the plurality of UEs. In the example of FIG. 14, the plurality of network slices 1410 include a network slice 1412 (e.g. network slice 1 of network slice type 1, which may be an "enterprise" type slice), a network slice 1414 (e.g. network slice 2 of network slice type 2, which may be an "IoT" type slice), and a network slice 1416 (e.g. network slice n of network slice type n, which may be a "consumer" type slice).

A plurality of network functions (NFs) may be utilized in each one of the network slices 1410. In the example of FIG. 14, a plurality of NFs 1420 may be utilized in network slice 1412, a plurality of NFs 1430 may be utilized in network slice 1414, and a plurality of NFs 1440 may be utilized in network slice 1416. The plurality of NFs 1420 of network slice 1412 may include an NF 1422 (e.g. NF 1 of NF type 1 which may be a PCF type), an NF 1424 (e.g. NF 2 of NF type 2 which may be a PCF type), and an NF 1426 (e.g. NF n of NF type n which may be a UPF type). In addition, the plurality of NFs 1430 of network slice 1414 may include an NF 1432 (e.g. NF 1 of NF type 1, which may be a PCF type), an NF 1434 (e.g. NF 2 of NF type 2, which may be a PCF type), and an NF 1436 (e.g. NF n of NF type n, which may be a UPF type). Even further, the plurality of NFs 1440 may include an NF 1442 (e.g. NF 1 of NF type 1, which may be a PCF type), an NF 1444 (e.g. NF 2 of NF type 2, which may be a PCF type), and an NF 1446 (e.g. NF n of NF type n, which may be a UPF type).

Again, the NF entity 1402 having the SAF 1404 includes DB 1406 for storing an aggregate of current operating state information associated with each UE of the plurality of UEs. The current operating state information for each UE may indicate a plurality of current operating states associated with each one of the plurality of NFs 1420, 1430, and 1440 across each one of the network slices 1412, 1414, and 1416 assigned to the UE. Types of operating states associated with a given UE may be or include, for example, a mobility state, a session state, and a policy state.

The NF entity 1402 having the SAF 1404 is configured to provide access to and/or change notifications for the information in the DB 1406 for each NF of the plurality of NFs 1420, 1430, and 1440 across the network slices 1412, 1414, and 1416. In some implementations, the NF entity 1402 having the SAF 1404 may obtain and/or provide the current operating state information with use of a publish-subscribe interprocess communication (IPC). The publish-subscribe IPC may involve communicating state event notifications (e.g. changes to operating state) to NFs across the network slices 1412, 1414, and 1416. In addition, or alternatively, NF entity 1402 having the SAF 1404 may also be configured to safeguard the information in the DB 1406 with use of assigned tokens and an access control layer and/or list (ACL). Using an ACL, permissions may be associated with an object, and these permissions may specify whether access to that object is granted and which operations may be allowed to be performed on the object. Each entry in an ACL may specify the subject and one or more associated operation(s) that are permitted.

Figure 15:
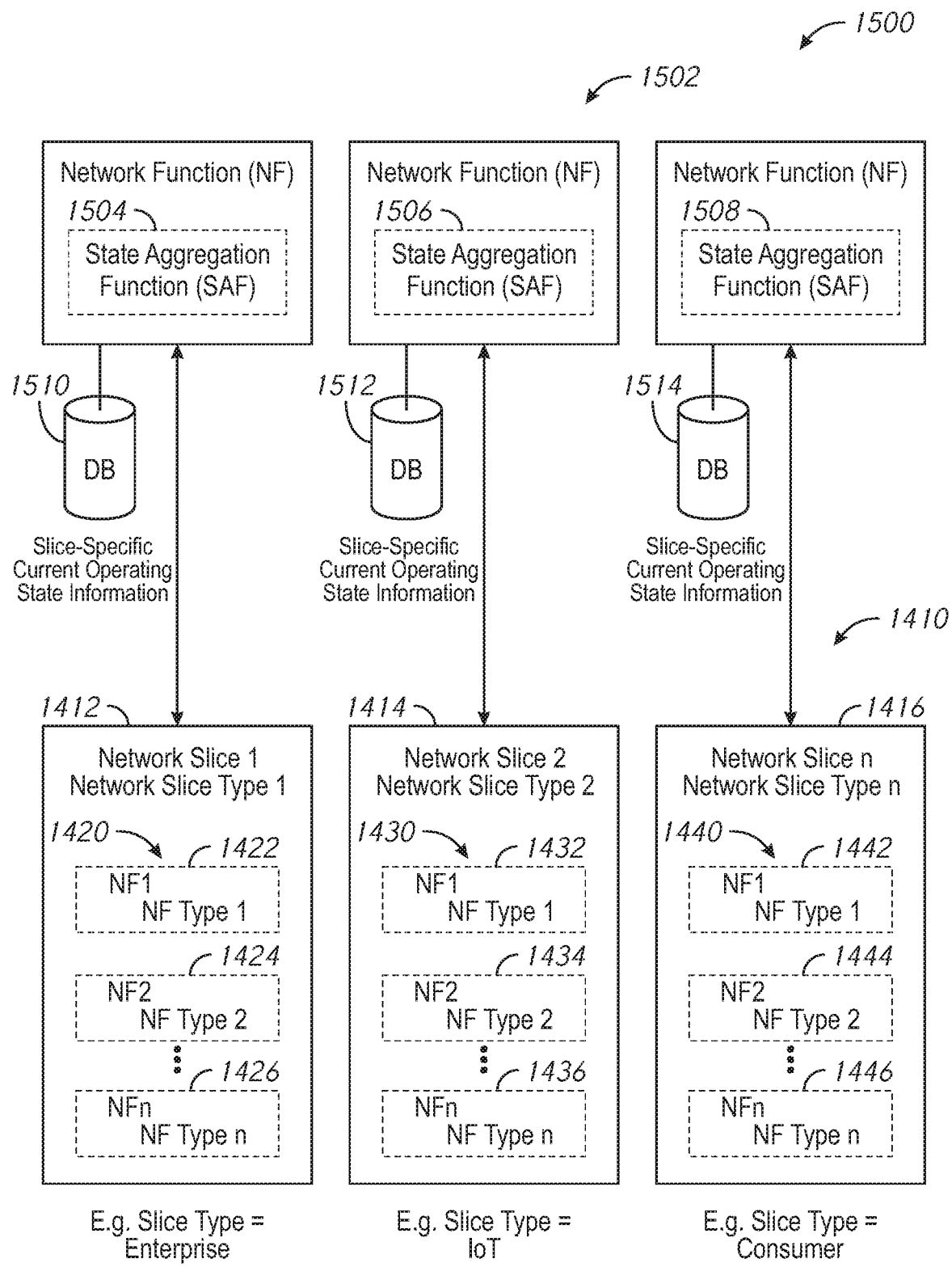
FIG. 15 is a block diagram of pertinent entities in the mobile network for use in managing operating state information of UEs using a plurality of local, slice-specific SAFs according to some implementations of the present disclosure.

FIG. 15 is a block diagram of pertinent entities 1500 in a mobile network for use in managing operating state information of UEs in a mobile network according to some implementations of the present disclosure.

As illustrated in FIG. 15, a plurality of local, slice-specific SAFs 1502 may be provided in the mobile network. Each one of slice-specific SAFs 1502 may be associated with a respective one of the plurality of network slices 1410 and include a DB for storing an aggregate of slice-specific, current operating state information associated with the respective slice.

More specifically in FIG. 15, the plurality of slice-specific SAFs 1502 include a slice-specific SAF 1504 associated with network slice 1412 and having a DB 1510 for storing slice-specific current operating state information associated with network slice 1412; a slice-specific SAF 1506 associated with network slice 1414 and having a DB 1512 for storing slice-specific current operating state information associated with network slice 1414; and a slice-specific SAF 1508 associated with network slice 1416 and having a DB 1514 for storing slice-specific current operating state information associated with network slice 1416.

Each slice-specific, current operating state information in a DB (i.e. DB 1510, 1512, or 1514) may indicate a plurality of slice-specific, current operating states associated with each NF of the plurality of NFs (e.g. NFs 1420, 1430, or 1440) within a respective slice (e.g. network slice 1412, 1414, or 1416). Types of operating states associated with a given UE may be or include, for example, a mobility state, a session state, and a policy state.

A slice-specific SAF (e.g. slice-specific SAF 1504, 1506, or 1508) may be configured to provide access to and/or change notifications for the information in its respective DB (e.g. DB 1510, 1512, or 1514) for NFs within its respective slice (e.g. network slice 1412, 1414, or 1416). In some implementations, the slice-specific SAF may obtain and/or provide slice-specific current operating states with use of a publish-subscribe IPC. In addition, or alternatively, the slice-specific SAF may be configured to safeguard the information in its respective DB with use of assigned tokens and an ACL. Again, using an ACL, permissions are associated with an object and these permissions specify whether access to that object is granted and which operations are allowed to be performed on that object. Each entry in an ACL may specify the subject and one or more associated operation(s) that are permitted.

In some implementations, the slice-specific SAFs 1502 are provided locally, at the edge, in one or more pertinent edge nodes of a mobile edge computing (MEC) environment.

Figure 16:
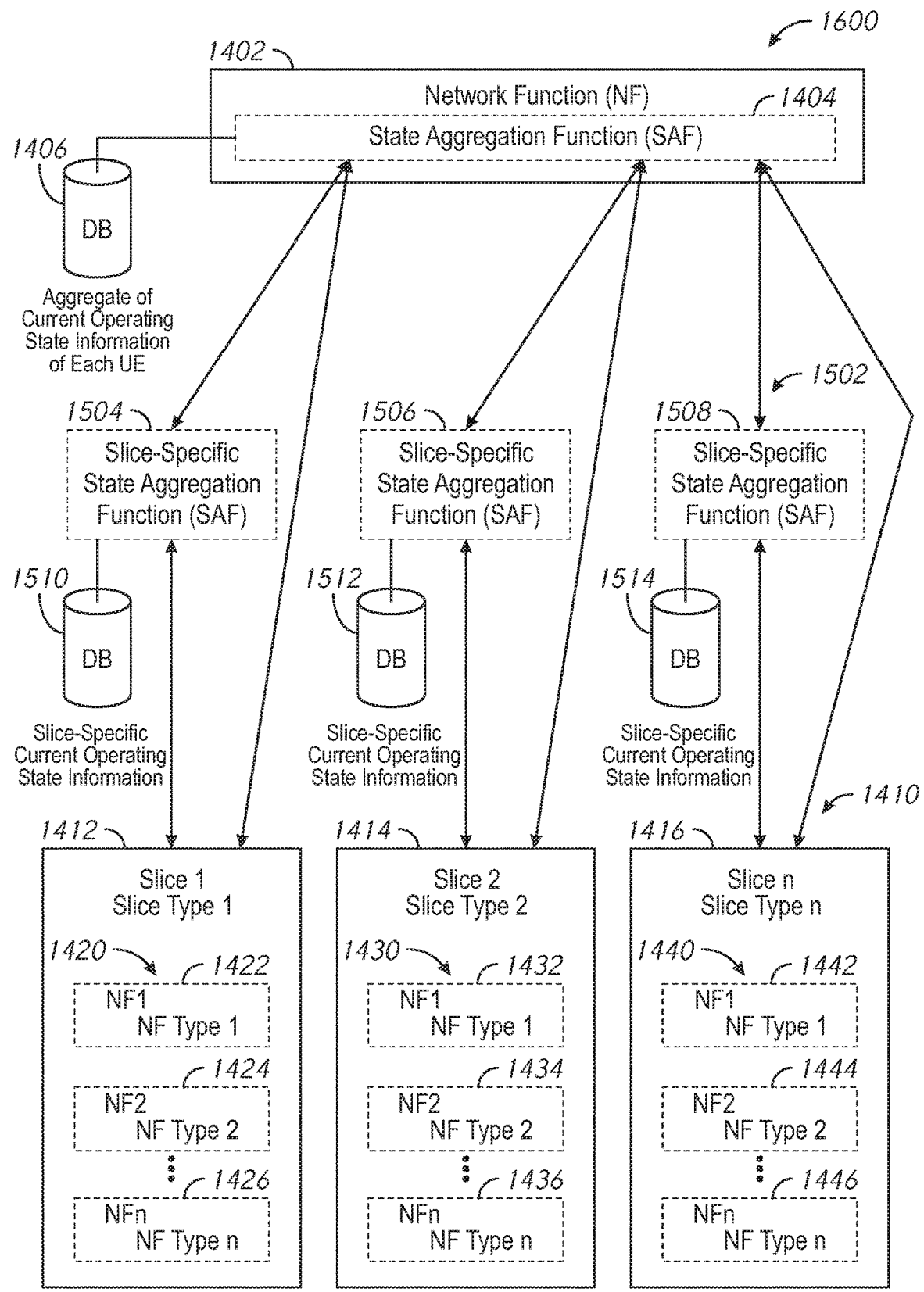
FIG. 16 is a block diagram of pertinent entities in the mobile network for use in managing operating state information of UEs using the SAF of FIG. 2 in combination with the plurality of local, slice-specific SAFs of FIG. 3 according to some implementations of the present disclosure.

FIG. 16 is a block diagram of pertinent entities 1600 in a mobile network for use in managing operating state information of UEs in a mobile network according to some preferred implementations of the present disclosure.

In FIG. 16, NF entity 1402 having SAF 1404 may be provided as a common slice function in a 5G core network. The NF entity 1402 having the SAF 1404 includes DB 1406 for storing current operating state information associated with each UE of the plurality of UEs, as described in relation to FIG. 14. In combination with NF entity 1402 having SAF 1404, the plurality of local, slice-specific SAFs 1502 (e.g. slice-specific SAFs 1504, 1506, and 1508) may also be provided in the mobile network. Each one of slice-specific SAFs 1502 is associated with a respective one of the plurality of network slices 1410 and includes a DB for storing slice-specific, current operating state information associated with the respective slice, as described in relation to FIG. 15.

Figure 17:
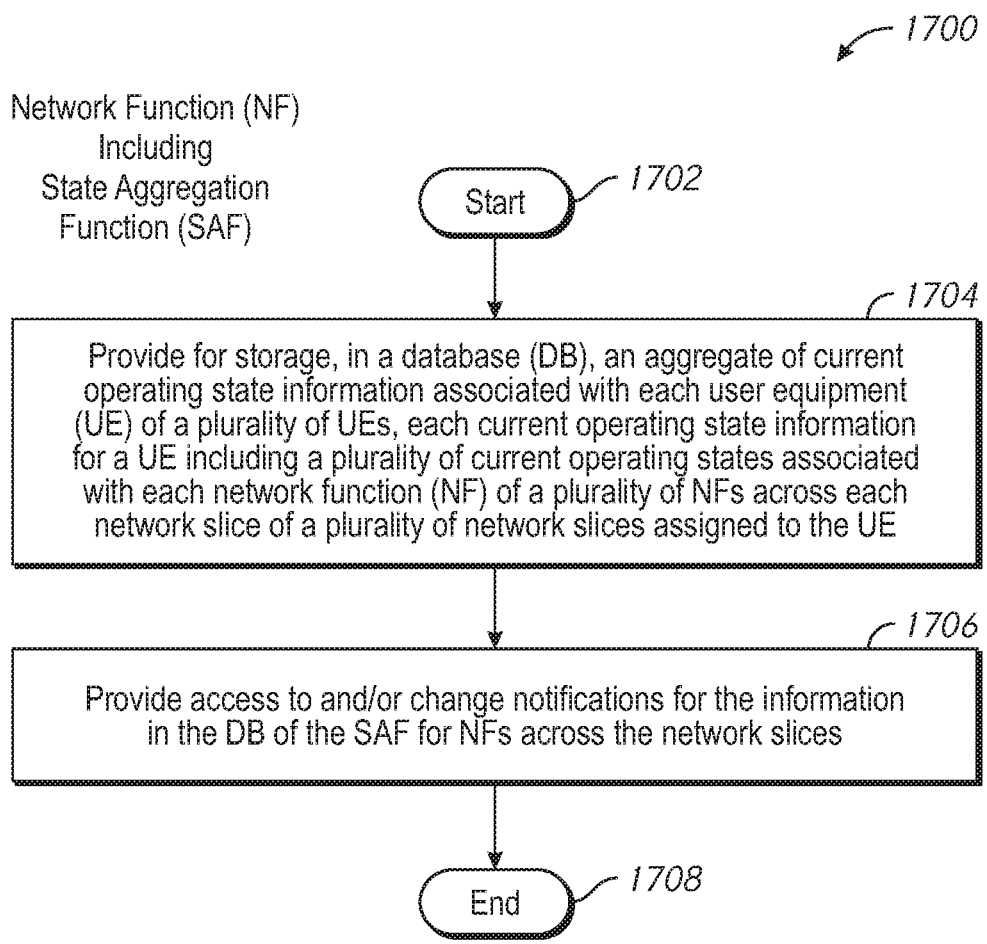
FIG. 17 is a flowchart for describing a method for use in managing operating state information of UEs using a SAF according to some implementations.

FIG. 17 is a flowchart 1700 for describing a method for use in managing operating state information of UEs using a state aggregation function (SAF) according to some implementations of the present disclosure.

Beginning at a start block 1702 of FIG. 17, an NF entity having the SAF provides for storage of, in a DB, an aggregate of current operating state information associated with each UE of a plurality of UEs (step 1704 of FIG. 17). Each current operating state information of a UE indicates a plurality of current operating states associated with each NF of a plurality of NFs across each network slice of a plurality of network slices assigned to the UE. The NF entity having the SAF provides access to and/or change notifications for the information in the DB for NFs across the plurality of network slices (step 1706 of FIG. 17). The flowchart ends at an end block 1708 of FIG. 17.

In some implementations of FIG. 17, the NF entity having the SAF may (regularly) obtain and/or provide the current operating state information with use of a publish/subscribe IPC. In addition, or alternatively, the NF entity having the SAF may safeguard the information in its DB with use of assigned tokens and an ACL.

Figure 18:
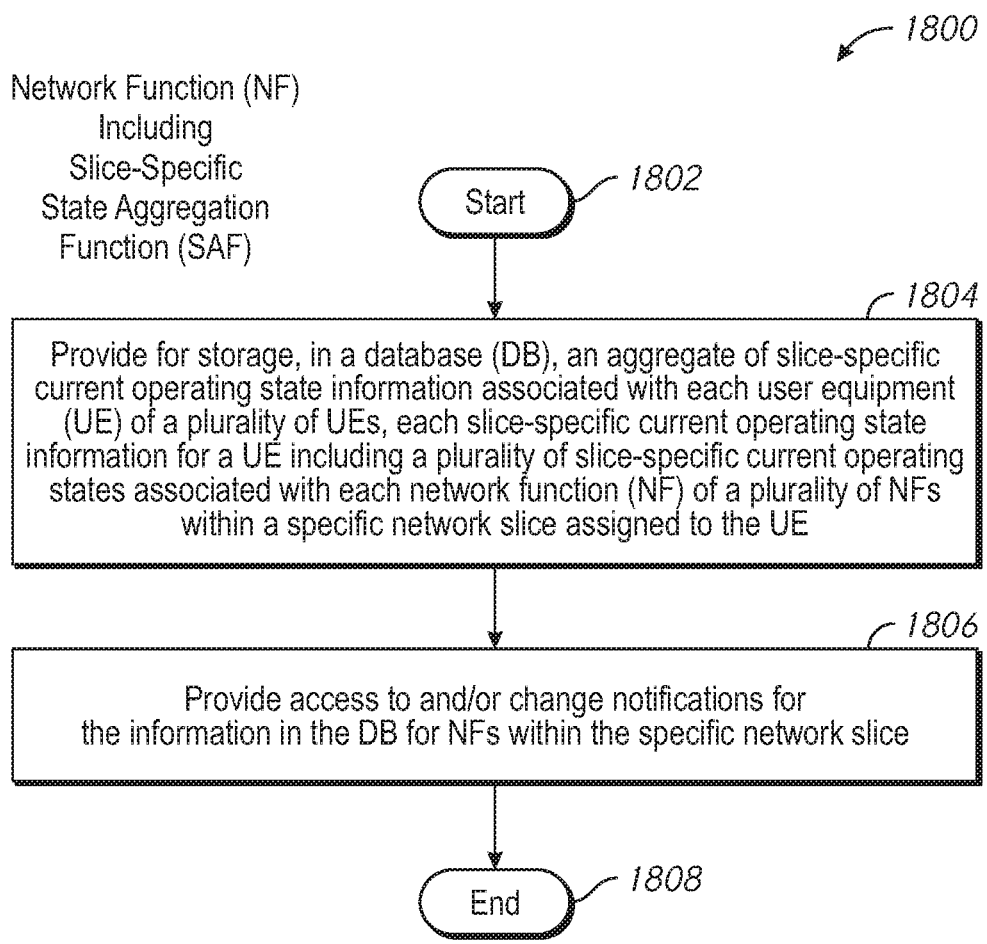
FIG. 18 is a flowchart for describing a method for use in managing operating state information of UEs using a plurality of local, slice-specific SAFs according to some implementations.

FIG. 18 is a flowchart 1800 for describing a method for use in managing operating state information of UEs using a plurality of local, slice-specific state aggregation functions (SAFs) according to some implementations of the present disclosure.

Beginning at a start block 1802 of FIG. 18, an NF entity having a local, slice-specific SAF provides for storage of, in a DB, an aggregate of slice-specific current operating state information associated with each UE of a plurality of UEs (step 1804 of FIG. 18). Each slice-specific current operating state information of a UE indicating a plurality of slice-specific, current operating states associated with each NF of a plurality of NFs in a specific one of a plurality of network slices assigned to the UE. The NF entity having the slice-specific SAF provides access to and/or change notifications for the information in the DB for NFs in the specific network slice (step 1806 of FIG. 18). The flowchart ends at an end block 1808 of FIG. 18.

In some implementations of FIG. 18, the NF entity having the slice-specific SAF may (regularly) obtain and/or provide the slice-specific current operating state information with use of a publish/subscribe IPC. In addition, or alternatively, the NF entity having the slice-specific SAF may be configured to safeguard the information in its DB with use of assigned tokens and an access control list (ACL).

Figure 19:
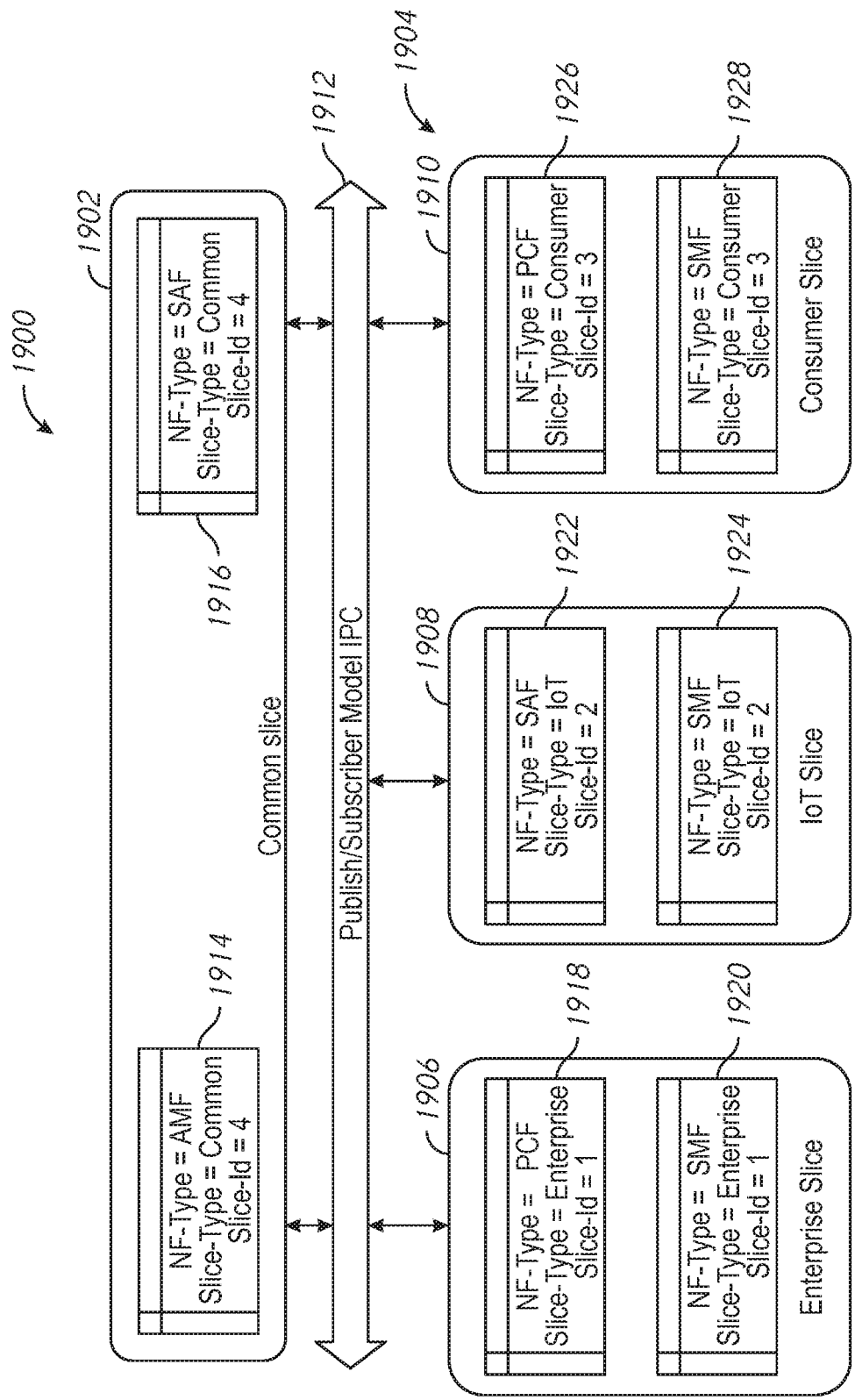
FIG. 19 is a block diagram of pertinent entities in the mobile network for providing access to and/or change notifications for operating state information in the DB of the SAF with use of a publish-subscribe interprocess communication (IPC)

FIG. 19 is a block diagram of pertinent entities 1900 in a mobile network for describing a publish-subscribe interprocess communication (IPC) between a SAF and a plurality of NFs, for (regularly) obtaining and/or providing current operating state information, according to some implementations of the present disclosure.

A common/shared slice 1902 of a 5G mobile network may provide one or more network functions (NFs), such as an NF 1914 and a NF 1916. In FIG. 19, NF 1914 is shown to be an AMF, and NF 1916 is shown to be a SAF of the present disclosure. A plurality of NFs are also provided in each one of a plurality of different network slices 1904. In FIG. 19, the plurality of network slices 1904 include a network slice 1906 (e.g. an "enterprise" type slice), a network slice 1908 (e.g. an "IoT" type slice), and a network slice 1910 (e.g. a "consumer" type slice). In FIG. 19, network slice 1906 has an NF 1918 (e.g. a PCF) and an NF 1920 (e.g. an SMF), network slice 1908 has an NF 1922 (e.g. a PCF) and an NF 1924 (e.g. an SMF), and network slice 1910 has an NF 1926 (e.g. a PCF) and an NF 1928 (e.g. an SMF).

In FIG. 19, a publish-subscribe IPC 1912 is provided so that NF 1916 having the SAF may obtain (and aggregate) current operating state information associated with each NF of the plurality of NFs 1918, 1920, 1922, 1924, 1926, and 1928 across network slices 1906, 1908, and 1910. Publish-subscribe IPC 1912 may further be provided so that NF 1916 having the SAF may provide access to and/or change notifications for the current operating state information for each NF of the plurality of NFs 1918, 1920, 1922, 1924, 1926, and 1928 across network slices 1906, 1908, and 1910.

Figure 20:
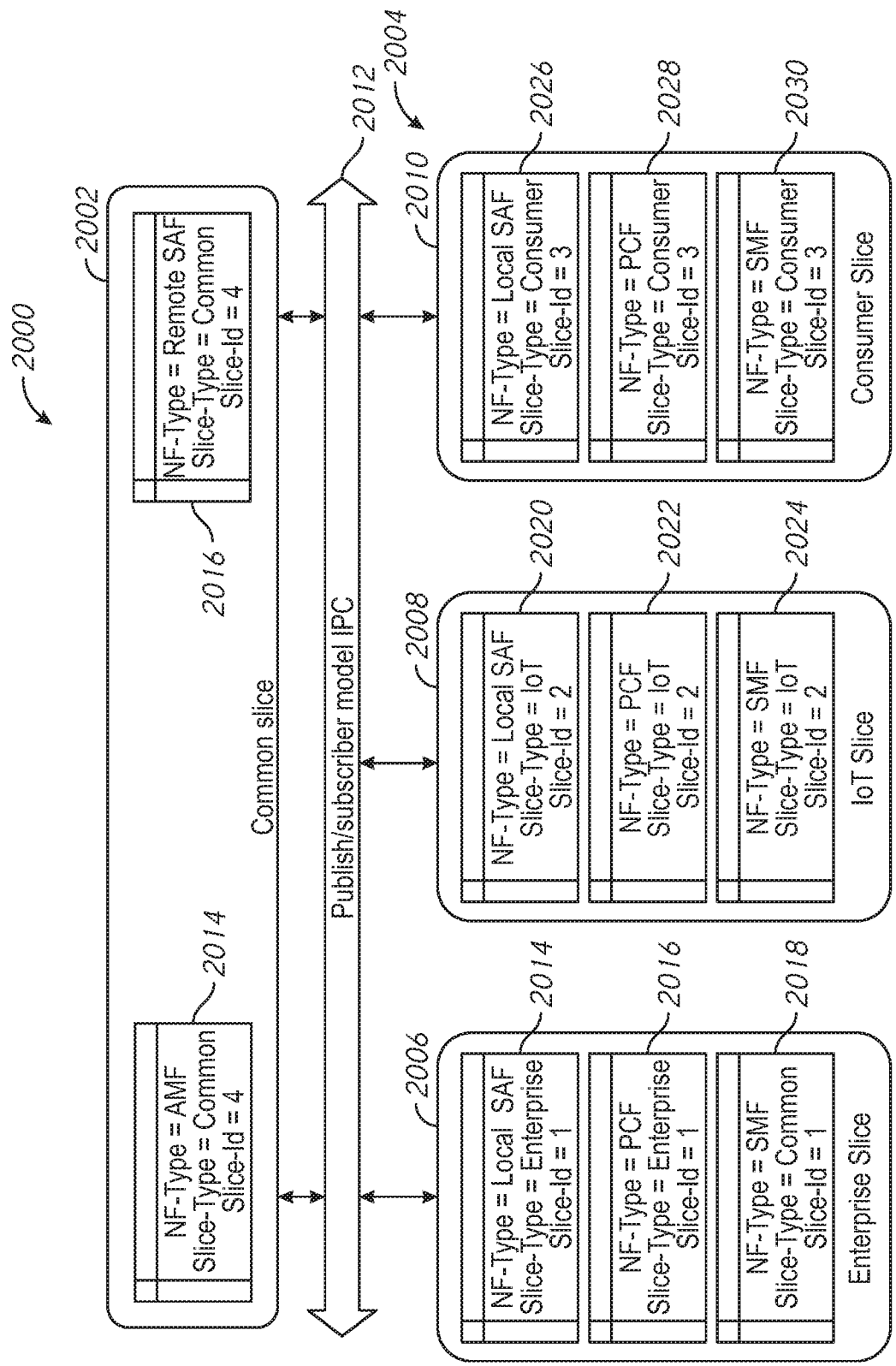
FIG. 20 is a block diagram of pertinent entities in the mobile network for providing access to and/or change notifications for operating state information in the DB of the SAF with use of the publish-subscribe IPC, where a plurality of local, slice-specific SAFs are also provided.

FIG. 20 is a block diagram of pertinent entities 2000 in a mobile network for describing a publish-subscribe interprocess communication (IPC) between a SAF and a plurality of NFs, in combination with a plurality of local, slice-specific SAFs, for (regularly) obtaining and/or providing current operating state information, according to some implementations of the present disclosure.

A common/shared slice 2002 of a 5G core network may provide one or more network functions (NFs), such as an NF

2014 and a NF 2016. In FIG. 20, NF 2014 is shown to be an AMF, and NF 2016 is shown to be a SAF of the present disclosure. A plurality of NFs are also provided in each one of a plurality of different network slices 2004. In FIG. 20, the plurality of network slices 2004 include a network slice 2006 (e.g. an "enterprise" type slice), a network slice 2008 (e.g. an "IoT" type slice), and a network slice 2010 (e.g. a "consumer" type slice). Network slice 2006 has an NF 2014 which is or includes a local or slice-specific SAF, an NF 2016 (e.g. a PCF), and an NF 2018 (e.g. an SMF); network slice 2008 has an NF 2020 which is or includes a local or slice-specific SAF, an NF 2022 (e.g. a PCF), and an NF 2024 (e.g. an SMF); and network slice 2010 has an NF 2026 which is or includes a local or slice-specific SAF, an NF 2028 (e.g. a PCF), and an NF 2030 (e.g. an SMF).

In FIG. 20, a publish-subscribe IPC 2012 is provided so that NF 2016 having the SAF may obtain (and aggregate) current operating state information associated with each NF of the plurality of NFs 2016, 2018, 2022, 2024, 2028, and 2030 across network slices 2006, 2008, and 2010. Publish-subscribe IPC 2012 may further be provided so that NF 1916 having the SAF may provide access to and/or change notifications for the current operating state information for each NF of the plurality of NFs 2016, 2018, 2022, 2024, 2028, and 2030 across network slices 2006, 2008, and 2010.

Each local, slice-specific SAFs 2014, 2020, and 2026 in FIG. 20 may also receive access to and/or change notifications from NF 2016 having the SAF with use of the publish subscribe IPC 2012. Each slice-specific SAF 2014, 2020, and 2026 may provide access to its respective database for each NF within its respective network slice 2006, 2008, and 2010. As is apparent, efficiency and reduced latency in signaling may be provided with use of the combined approach with local, slice-specific SAFs.

Figure 21:
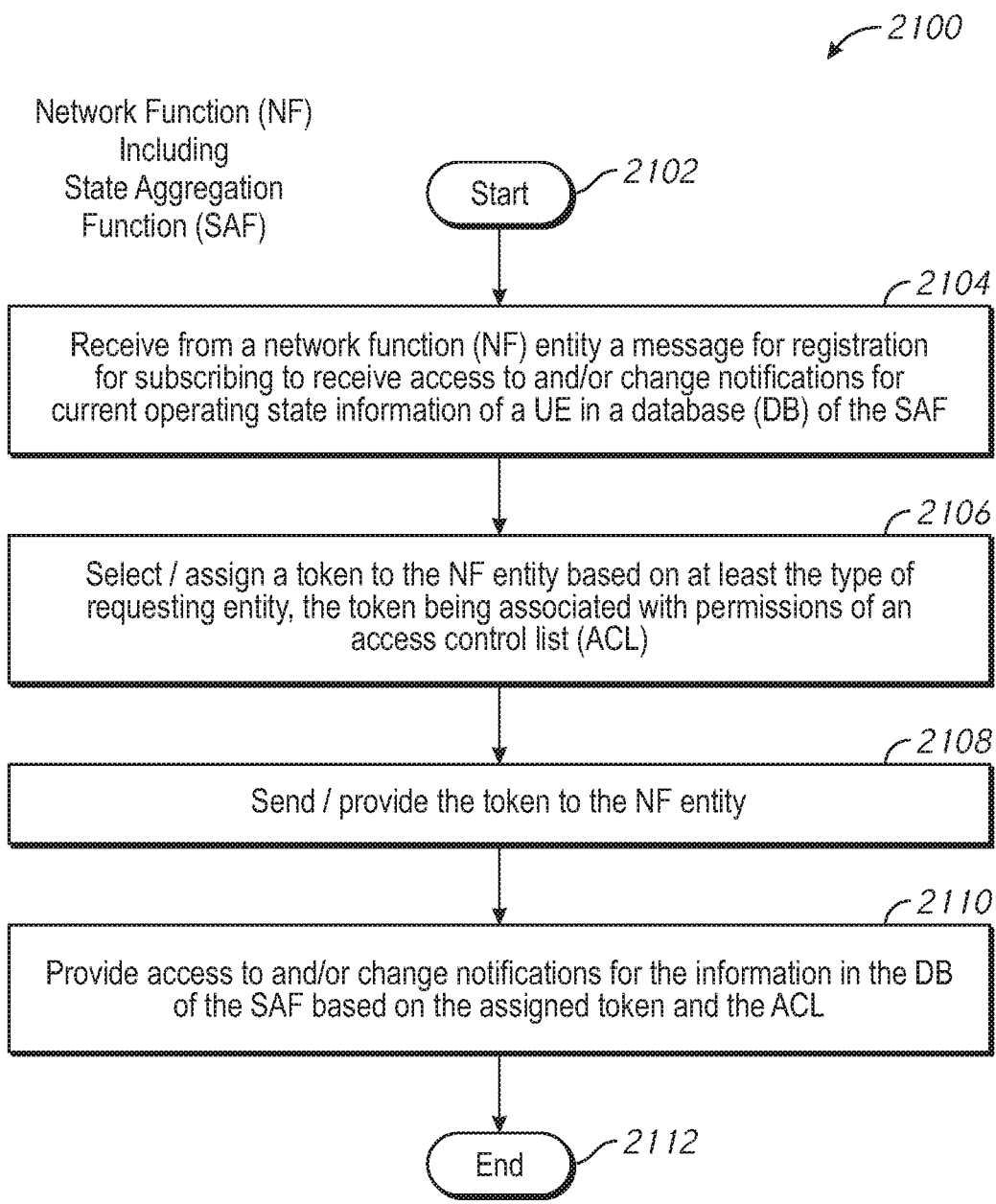
FIG. 21 is a flowchart for describing a method for use in managing operating state information for UEs with use of a SAF, particularly relating to providing access to and/or change notifications for the information in the DB of the SAF with use of assigned tokens and an access control list (ACL)

FIG. 21 is a flowchart 2100 for describing a method for use in managing operating state information of UEs according to some implementations of the present disclosure. The method may be performed by a network function (NF) entity having a state aggregation function (SAF) including a DB as described herein. The method of FIG. 21 more particularly relates to providing access to and/or change notifications for current operating state information in the DB of the SAF with use of assigned tokens and an access control list (ACL).

Beginning at a start block 2102 of FIG. 21, a message for registration with the SAF may be received from a network function (NF) entity (step 2104 of FIG. 21). The message for registration may be or include (implicitly or explicitly) a request for a subscription to receive access to and/or change notifications for the current operating state information in the DB. For this purpose, a token may be selected and assigned to the NF entity (step 2106 of FIG. 21). The selected and assigned token may be sent or otherwise provided to the NF entity (step 2108 of FIG. 21). Thereafter, the SAF may provide access to and/or change notifications for the information in the DB based on the assigned token and the ACL (step 2110 of FIG. 21). The flowchart ends at an end block 2112 of FIG. 21.

In FIG. 21, the selected and assigned token may be associated with specific permissions (e.g. read, write, update, etc.). The permissions may indicate an appropriate level of access to, and/or allowable/disallowable operations on, etc., the current operating state information in the DB of the SAF. The permissions may be indicated or used in association with an access control list (ACL) of the SAF. The token may be selected and assigned to the NF entity based on at least the type of requesting entity. For example, the token may be selected and assigned to the NF entity based on NF type (e.g. SMF vs. PCF vs. AMF), user vs. administration type, etc.

Figure 22:
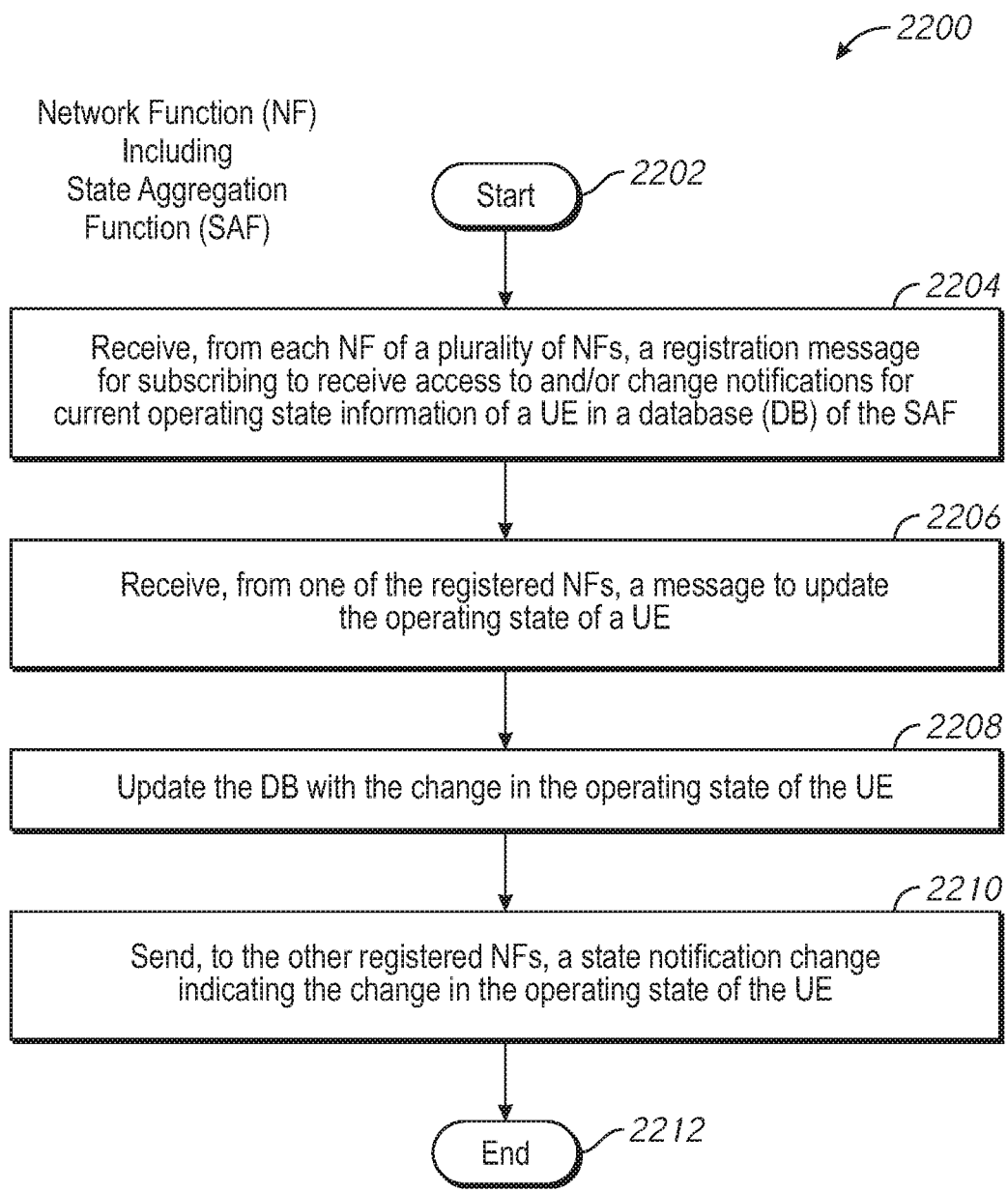
FIG. 22 is a flowchart for describing a method for use in managing operating state information for UEs with use of a SAF, particularly relating to providing access to and/or change notifications for the information in the DB of the SAF.

FIG. 22 is a flowchart 2200 for describing a method for use in managing operating state information of UEs according to some implementations of the present disclosure. The method may be performed by a network function (NF) entity having a state aggregation function (SAF) with a DB as described herein. The method of FIG. 22 more particularly relates to providing access to and/or change notifications for current operating state information in the DB of the SAF.

Beginning at a start block 2202 of FIG. 22, a message for registration with the SAF may be received from each one of a plurality of NFs (step 2204 of FIG. 22). Each message for registration may be or include (implicitly or explicitly) a request for a subscription to receive access to and/or change notifications for current operating state information stored in the DB. Subsequently, during network operation, a message to change or set (e.g. WRITE) an operating state of a UE is received from one of the registered NFs (step 2206 of FIG. 22). In response, the DB of the SAF is written to or updated with the change in operating state of the UE (step 2208 of FIG. 22). The update or write to the DB may be performed based on the permissions granted to the registered NF, using an assigned token and the ACL. In response to the update, the state event notification or change notification is sent to each one of the other registered NFs (step 2210 of FIG. 22). The state event notification may indicate the updated, current operating state. The flowchart ends at an end block 2212 of FIG. 22, but the method may be repeated for additional updates from NFs and notifications to NFs.

Figure 23A:
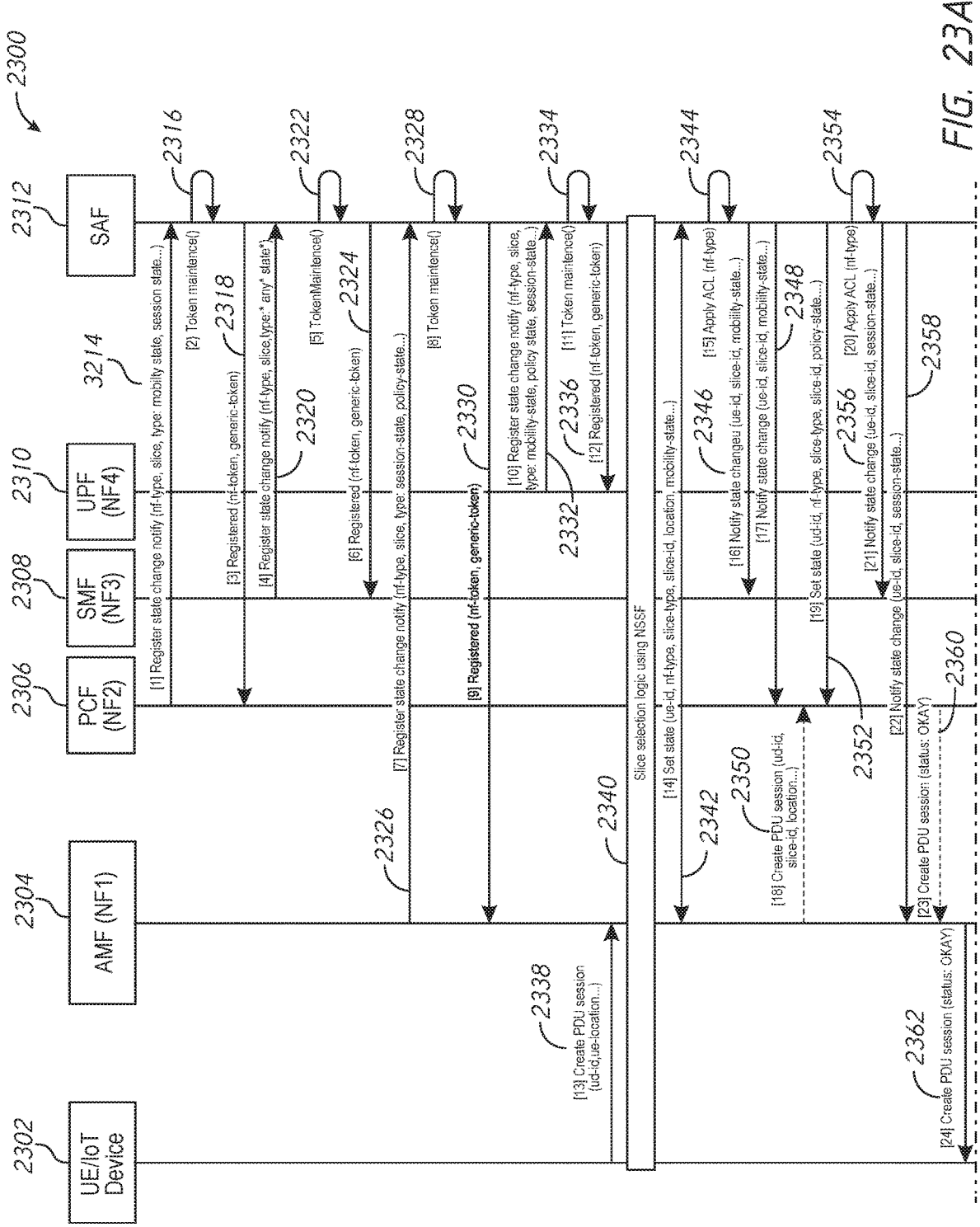
FIGS. 23A-23B form a message flow diagram for describing an example message flow for managing operating state information for UEs with use of a SAF, particularly relating to providing access to and/or change notifications for the information in the DB of the SAF.
Figure 23B:
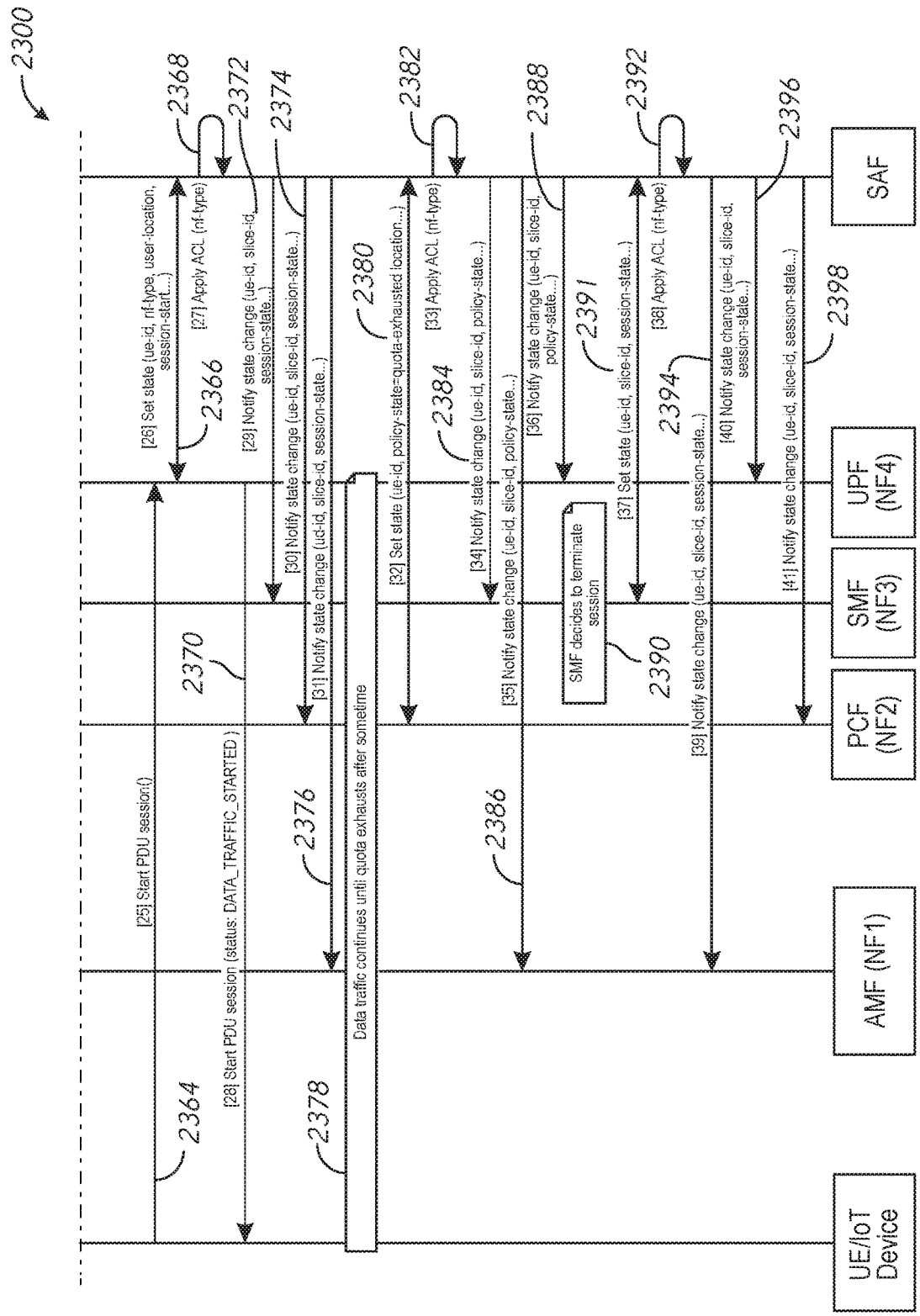

FIGS. 23A-23B form a message flow diagram for describing an example message flow for managing operating state information for UEs with use of a SAF 2312 according to some implementations of the present disclosure. The message flow may particularly relate to providing access to and/or change notifications for the information in the DB of the SAF.

In FIG. 23A, a message flow diagram 2300 indicates a plurality of network functions (NFs) which include an AMF 2304 (e.g. NF1), a PCF 2306 (e.g. NF2), an SMF 2308 (e.g. NF3), and a UPF 230 (e.g. NF4). SAF 2312 may manage the current operating state information of a plurality of UEs which includes a UE 2302.

To begin, PCF 2306 sends a message for registration to SAF 2312 (step 2314 of FIG. 23A). The message for registration may be a message to register for state change notifications. The message may include indications of NF type, network slice type, and operating states for which to receive notifications (e.g. mobility state, session state). SAF 2312 may select and assign a token to PCF 2306 (step 2316 of FIG. 23A). The token may be associated with specific permissions (e.g. read, write, update, etc.). SAF 2312 may send to PCF 2316 a message for confirmation of the registration which includes the assigned token (step 2318 of FIG. 23A).

Additional registrations with SAF 2312 from additional NFs are also performed. More particularly, SMF 2308 sends a message for registration to SAF 2312 (step 2320 of FIG. 23A). Again, the message may include indications of NF type, network slice type, and operating states for which to receive notifications (e.g. any state). SAF 2312 may select and assign a token to SMF 2308 (step 2322 of FIG. 23A). The token may be associated with specific permissions (e.g. read, write, update, etc.). SAF 2312 may send to SMF 2308 a message for confirmation of the registration which includes the assigned token (step 2324 of FIG. 23A). In addition, AMF 2304 sends a message for registration to SAF 2312 (step 2326 of FIG. 23A). The message may include indications of NF type, network slice type, and operating states for which to receive notifications (e.g. policy state, and session state). SAF 2312 may select and assign a token to AMF 2304 (step 2328 of FIG. 23A). SAF 2312 may send to AMF 2304 a message for confirmation of the registration which includes the assigned token (step 2330 of FIG. 23A). Further, UPF 2310 sends a message for registration to SAF 2312 (step 2332 of FIG. 23A). The message may include indications of NF type, network slice type, and operating states for which to receive notifications (e.g. mobility state, policy state, and session state). SAF 2312 may select and assign a token to UPF 2310 (step 2334 of FIG. 23A). SAF 2312 may send to UPF 2310 a message for confirmation of the registration which includes the assigned token (step 2336 of FIG. 23A).

Some during operation, UE 2302 sends via an access network a message for creating a data session (step 2338 of FIG. 23A). More particularly, the message may be a message for creating PDU session which is sent to AMF 2304. Network slice selection is performed using a network slice selection function (NSSF) (step 2340 of FIG. 23A). An operating state (e.g. the mobility state) of UE 2302 is therefore changed. In response, AMF 2304 sends a message for setting an operating state in SAF 2312 (step 2342 of FIG. 23A). The message may be referred to as a set state message. The message may indicate a UE identifier, an NF type, a network slice type, a network slice identifier, a location, and the mobility state. The update or write to the DB of SAF 2312 is performed based on permissions granted to AMF 2304 using the assigned token (or NF type) and the ACL (step 2344 of FIG. 23A). In response, SAF 2312 sends a state change notification indicating the (changed) operating state to SMF 2308 (step 2346 of FIG. 23A) and to PCF 2306 (step 2348 of FIG. 23A).

AMF 2304 then sends to PCF 2306 a message for creating the PDU session (step 2350 of FIG. 23A). An operating state (e.g. the policy state) of UE 2302 is therefore changed. In response, PCF 2306 sends a message for setting an operating state in SAF 2312 (step 2352 of FIG. 23A). The message may indicate a UE identifier, an NF type, a network slice type, a network slice identifier, a location, and the policy state. The update or write to the DB of SAF 2312 is performed based on permissions granted to PCF 2306 using the assigned token (or NF type) and the ACL (step 2354 of FIG. 23A). In response, SAF 2312 sends a state change notification indicating the (changed) operating state to SMF 2308 (step 2356 of FIG. 23A) and to AMF 2304 (step 2358 of FIG. 23A). PCF 2306 then sends to AMF 2304 a message for confirming or acknowledging the PDU session creation (step 2360 of FIG. 23A). In turn, AMF 2304 sends to UE 2302 a message for confirming or acknowledging the PDU session creation (step 2362 of FIG. 23A).

Continuing with a message flow diagram 2301 of FIG. 23B, UE 2302 sends to UPF 2310 a message for starting the PDU session (step 2364 of FIG. 23B). An operating state (e.g. the session state) of UE 2302 is therefore changed. In response, UPF 2310 sends a message for setting an operating state in SAF 2312 (step 2366 of FIG. 23B). The message may indicate a UE identifier, an NF type, a location, and the session state. The update or write to the DB of SAF 2312 is performed based on permissions granted to UPF 2310 using the assigned token (or NF type) and the ACL (step 2368 of FIG. 23B). UPF 2310 then sends to UE 2302 a message for confirming or acknowledging the PDU session for communication (step 2370 of FIG. 23B). In response, SAF 2312 sends a state change notification indicating the (changed) operating state to SMF 2308 (step 2372 of FIG. 23B), to PCF 2306 (step 2374 of FIG. 23B), and to AMF 2304 (step 2376 of FIG. 23B).

Data traffic is communicated in the PDU session (step 2378 of FIG. 23B). In this example, a quota limit for the data communication is reached, which will terminate the data session. An operating state (e.g. the policy state) of UE 2302 is therefore changed. In response, PCF 2306 sends a message for setting an operating state in SAF 2312 (step 2380 of FIG. 23B). The message may indicate a UE identifier, an NF type, a network slice type, a network slice identifier, a location, and the policy state. The update or write to the DB of SAF 2312 is performed based on permissions granted to PCF 2306 using the assigned token (or NF type) and the ACL (step 2382 of FIG. 23B). In response, SAF 2312 sends a state change notification indicating the (changed) operating state to SMF 2308 (step 2384 of FIG. 23B), to AMF 2304 (step 2386 of FIG. 23), and to UPF 2310 (step 2388 of FIG. 23B).

In response, SMF 2308 determines to terminate the PDU session (step 2390 of FIG. 23B). An operating state (e.g. the session state) of UE 2302 is therefore changed. In response, SMF 2308 sends a message for setting an operating state in SAF 2312 (step 2391 of FIG. 23B). The message may indicate a UE identifier, an NF type, a network slice type, a network slice identifier, a location, and the policy state. The update or write to the DB of SAF 2312 is performed based on permissions granted to PCF 2306 using the assigned token (or NF type) and the ACL (step 2392 of FIG. 23B). In response, SAF 2312 sends a state change notification indicating the (changed) operating state to AMF 2304 (step 2394 of FIG. 23B), to UPF 2310 (step 2396 of FIG. 23), and to 2306 (step 2398 of FIG. 23B).

Note that a server or network device may be used in some implementations of the SAF or SAF techniques of the present disclosure, for example, as described earlier in relation to FIG. 13.

Thus, methods and apparatus for use in managing operating state information of UEs using a state aggregation function (SAF) have been described. In one illustrative example, an NF entity having a SAF may be provided as a common slice in a 5G core network. The NF entity having the SAF includes a DB for storing current operating state information associated with each UE of a plurality of a UEs. Each current operating state information for each UE may indicate a plurality of current operating states (e.g. a mobility state, a session state, and a policy state) associated with each NF of a plurality of NFs across each network slice of a plurality of network slices assigned to the UE. The NF entity having the SAF may be configured to provide access to and/or change notifications for the information in the DB for NFs across the plurality of network slices. In some implementations, the NF entity having the SAF may obtain and/or provide the current operating state information with use of a publish-subscribe interprocess communication (IPC). The publish-subscribe IPC may involve communicating state event notifications (e.g. changes to operating state) to NFs across the plurality of network slices. The information in the DB of the SAF may be safeguarded with use of an access control list (ACL). In addition, or alternatively, a plurality of slice-specific NF entities each having a slice-specific SAF may be provided.

Note that the components and techniques shown and described in relation to the separate figures may indeed be provided as separate components and techniques. In some implementations, one or more (or all of) the components and techniques shown and described in relation to the separate figures are provided together for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first NF could be termed a second NF, and, similarly, a second NF could be termed a first NF, without changing the meaning of the description, so long as all occurrences of the "first NF" are renamed consistently and all occurrences of the second NF are renamed consistently. The first NF and the second NF are both NFs, but they are not the same NF.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a network function (NF) entity comprising a state aggregation function in a mobile network,
providing for storage of, in a database (DB), current state information associated with each user equipment (UE) of a plurality of a-UEs, the current state information associated with each UE including a current operating state of each NF of a plurality of NFs across each network slice of a plurality of network slices assigned to the UE; and
providing access to and/or change notifications for the current state information in the DB for the plurality of NFs in the mobile network.

2. The method of claim 1, wherein the NF entity comprising the state aggregation function is provided as a common slice in a 5G core network.

3. The method of claim 2, wherein providing the access to and/or state change notifications for the current state information in the DB further comprises:
providing the access to and/or change notifications for the current state information in the DB for the plurality of NFs across the plurality of network slices.

4. The method of claim 1, further comprising:
safeguarding access to the current state information in the DB for each NF based on an assigned token and an access control list (ACL).

5. The method of claim 1, further comprising:
obtaining the current state information with use of a publish-subscribe interprocess communication (IPC) comprising:
registering, as a subscriber, for one or more subscriptions to receive the current state information which is published by the plurality of NFs across each network slice.

6. The method of claim 1, wherein the NF entity comprising the state aggregation function includes a centralized state aggregation function and the DB includes comprises a centralized DB, the method further comprising:
at another NF entity comprising a slice-specific state aggregation function in the mobile network,
providing for storage of, in a slice-specific DB, slice-specific current state information associated with each UE of the plurality of UEs, the slice-specific current state information comprising a plurality of slice-specific current operating states associated with a subset of the plurality of NFs in a specific network slice of the plurality of network slices assigned to the UE; and
providing access to the slice-specific DB for the subset of the plurality of NFs in the specific network slice in the mobile network.

7. The method of claim 1, wherein the NF entity comprising the state aggregation function includes a centralized state aggregation function and the DB includes a centralized DB, the method further comprising:
at each one of a set of NF entities, each including a slice-specific state aggregation function in the mobile network,
providing for storage of, in a slice-specific DB, slice-specific current state information associated with each UE of a plurality of UEs, each slice-specific current state information includes a plurality of slice-specific current operating states associated with a subset of the plurality of NFs in a specific network slice of the plurality of network slices assigned to the UE; and
providing access to the slice-specific DB for the subset of the plurality of NFs in the specific network slice in the mobile network.

8. The method of claim 1, further comprising:
obtaining, by the state aggregation function, the current operating state of each of the plurality of NFs of a network slice from among the plurality of network slices, wherein a plurality of current operating states comprises a mobility state, a session state, and a policy state.

9. The method of claim 1, wherein the plurality of NFs include a session management function (SMF) and a policy control function (PCF) in the mobile network.

10. A device comprising:
one or more processors;
a non-transitory memory including computer program instructions that when executed by the one or more processors cause the device to performing operations including:
providing for storage of, in a database (DB), current state information associated with each user equipment (UE) of a plurality of UEs, the current state information associated with each UE including a current operating state of each network function entity (NF) of a plurality of NFs across each network slice of a plurality of network slices assigned to the UE; and
providing access to and/or change notifications for the current state information in the DB for the plurality of NFs in a mobile network.

11. The device of claim 10, further including a NF entity with a state aggregation function providing the current state information for storage in the DB and providing the access to and/or change notifications for the current state information, wherein the state aggregation function is provided as a common slice in a 5G core network.

12. The device of claim 11, wherein the non-transitory memory further includes computer program instructions that when executed by the one or more processors cause the device to perform the operation of providing the access to and/or state change notifications for the current state information in the DB by:
providing the access to and/or change notifications for the current state information in the DB for the plurality of NFs across the plurality of network slices.

13. The device of claim 10, wherein the non-transitory memory further includes computer program instructions that when executed by the one or more processors cause the device to perform the operations including:
safeguarding access to the current state information in the DB for each NF based on an assigned token and an access control list (ACL).

14. The device of claim 10, wherein the non-transitory memory further includes computer program instructions that when executed by the one or more processors cause the device to perform the operations including:
obtaining the current state information with use of a publish-subscribe interprocess communication (IPC) comprising:
registering, as a subscriber, for one or more subscriptions to receive the current state information which is published by the plurality of NFs across each network slice.

15. The device of claim 10, further comprising a NF entity that includes a centralized state aggregation function, wherein the DB comprises a centralized DB, the non-transitory memory further includes computer program instructions that when executed by the one or more processors cause the device to perform the operations including:
at another NF entity comprising a slice-specific state aggregation function in the mobile network,
providing for storage of, in a slice-specific DB, slice-specific current state information associated with each UE of the plurality of UEs, the slice-specific current state information comprising a plurality of slice-specific current operating states associated with a subset of the plurality of NFs in a specific network slice of the plurality of network slices assigned to the UE; and
providing access to the slice-specific DB for the subset of the plurality of NFs in the specific network slice in the mobile network.

16. The device of claim 10, further comprising a NF entity that includes a centralized state aggregation function, wherein the DB comprises a centralized DB, the non-transitory memory further includes computer program instructions that when executed by the one or more processors cause the device to:
at each one of a plurality of NF entities each comprising a slice-specific state aggregation function in the mobile network,
provide for storage of, in a slice-specific DB, slice-specific current state information associated with each UE of the plurality of UEs, the slice-specific current state information comprising a plurality of slice-specific current operating states associated with a subset of the plurality of NFs in a specific network slice of the plurality of network slices assigned to the UE; and
provide access to the slice-specific DB for the subset of the plurality of NFs in the specific network slice in the mobile network.

17. The device of claim 10, wherein the non-transitory memory further includes computer program instructions that when execute by the one or more processors cause the device to:
obtain the current operating state of each of the plurality of NFs of a network slice from among the plurality of network slices,
wherein a plurality of current operating states comprises a mobility state, a session state, and a policy state.

18. The device of claim 10, wherein the plurality of NFs include a session management function (SMF) and a policy control function (PCF) in the mobile network.

19. One or more non-transitory computer readable storage media encoded with software comprising computer executable instructions and when the software is executed operable to:
providing, by a state aggregation function of a mobile network, for storage of, in a database (DB), current state information associated with each user equipment (UE) of a plurality of UEs, the current state information associated with each UE including a current operating state of each network function (NF) of a plurality of NFs across each network slice of a plurality of network slices assigned to the UE; and
providing access to and/or change notifications for the current state information in the DB for the plurality of NFs in the mobile network.

20. The one or more non-transitory computer readable storage media of claim 19, wherein the state aggregation function is provided as a common slice in a 5G core network.

* * * * *

UNITED STATES PATENT AND TRADEMARK OFFICE
CERTIFICATE OF CORRECTION

PATENT NO.       : 10,638,306 B2
APPLICATION NO.  : 15/855859
DATED            : April 28, 2020
INVENTOR(S)      : Ravi Shekhar et al.

Page 1 of 1

It is certified that error appears in the above-identified patent and that said Letters Patent is hereby corrected as shown below:

In the Claims

Claim 1, Column 21, Line 65, please replace "of a-UEs," with --of UEs,--

Claim 6, Column 22, Line 30, please replace "includes comprises a" with --includes a--

Claim 10, Column 23, Line 17, please replace "entity (NF) of" with --(NF) of--

Signed and Sealed this
Seventh Day of July, 2020

Andrei Iancu
*Director of the United States Patent and Trademark Office*